(12) United States Patent
Kinoshita

(10) Patent No.: US 10,455,154 B2
(45) Date of Patent: Oct. 22, 2019

(54) IMAGE PROCESSING DEVICE, IMAGE PROCESSING METHOD, AND PROGRAM INCLUDING STABLE IMAGE ESTIMATION AND MAIN SUBJECT DETERMINATION

(71) Applicant: Sony Corporation, Tokyo (JP)

(72) Inventor: Masaya Kinoshita, Kanagawa (JP)

(73) Assignee: Sony Corporation, Tokyo (JP)

(*) Notice: Subject to any disclaimer, the term of this patent is extended or adjusted under 35 U.S.C. 154(b) by 185 days.

(21) Appl. No.: 14/381,272

(22) PCT Filed: Feb. 22, 2013

(86) PCT No.: PCT/JP2013/055609
§ 371 (c)(1),
(2) Date: Aug. 27, 2014

(87) PCT Pub. No.: WO2013/133142
PCT Pub. Date: Sep. 12, 2013

(65) Prior Publication Data
US 2015/0116517 A1    Apr. 30, 2015

(30) Foreign Application Priority Data
Mar. 9, 2012 (JP) ................. 2012-052453

(51) Int. Cl.
*H04N 5/232* (2006.01)

(52) U.S. Cl.
CPC ..... *H04N 5/23248* (2013.01); *H04N 5/23219* (2013.01); *H04N 5/23251* (2013.01);
(Continued)

(58) Field of Classification Search
CPC .......... H04N 5/23219; H04N 5/23248; H04N 5/23251; H04N 5/14; H04N 5/23258;
(Continued)

(56) References Cited

U.S. PATENT DOCUMENTS

2008/0068466 A1    3/2008   Tamaru et al.
2008/0101710 A1    5/2008   Hatano
(Continued)

FOREIGN PATENT DOCUMENTS

EP    2148499 A2    1/2010
JP    2002-064728 A    2/2002
(Continued)

OTHER PUBLICATIONS

Chinese Office Action dated Jan. 17, 2017 in connection with Chinese Application No. 201380012098.6, and English translation thereof.
(Continued)

*Primary Examiner* — Joel W Fosselman
(74) *Attorney, Agent, or Firm* — Wolf, Greenfield & Sacks, P.C.

(57) ABSTRACT

An image processing device includes a stable imaging state estimation portion that performs a stable imaging state estimation process of estimating whether or not a stable imaging state occurs, and a main subject determination portion that performs a main subject determination process. The main subject determination portion outputs a result of the main subject determination process when it is estimated that the stable imaging state occurs due to the stable imaging state estimation process.

15 Claims, 24 Drawing Sheets

(52) U.S. Cl.
CPC ..... *H04N 5/23296* (2013.01); *H04N 5/23241* (2013.01); *H04N 5/23254* (2013.01); *H04N 5/23258* (2013.01)

(58) Field of Classification Search
CPC ........... H04N 5/23254; H04N 5/23293; H04N 5/23222; H04N 5/23212; G03B 17/18; G06T 7/2006; G06T 7/204; G06T 2207/10016; G06T 2207/10004; G06T 2207/30201; G01S 3/7864
See application file for complete search history.

(56) References Cited

U.S. PATENT DOCUMENTS

| | | | |
|---|---|---|---|
| 2008/0187185 A1 | 8/2008 | Misawa et al. | |
| 2009/0231457 A1 | 9/2009 | Lee et al. | |
| 2010/0020244 A1* | 1/2010 | Mitsuya | G06T 7/2026 348/699 |
| 2010/0053358 A1* | 3/2010 | Kodama | G06T 7/204 348/222.1 |
| 2010/0097515 A1* | 4/2010 | Ishii | H04N 5/23219 348/349 |
| 2010/0208126 A1* | 8/2010 | Uenishi | H04N 5/23212 348/345 |

FOREIGN PATENT DOCUMENTS

| | | |
|---|---|---|
| JP | 2005-037273 A | 2/2005 |
| JP | 2008-028758 A | 2/2008 |
| JP | 2010-191073 A | 9/2010 |
| JP | 2011-146826 A | 7/2011 |
| JP | 2011-146827 A | 7/2011 |
| JP | 2011-160379 A | 8/2011 |
| JP | 2011-166305 A | 8/2011 |

OTHER PUBLICATIONS

Korean Office Action dated Mar. 5, 2019 in connection with Korean Application No. 10-2014-7023812, and English translation thereof.

* cited by examiner

FIG. 6
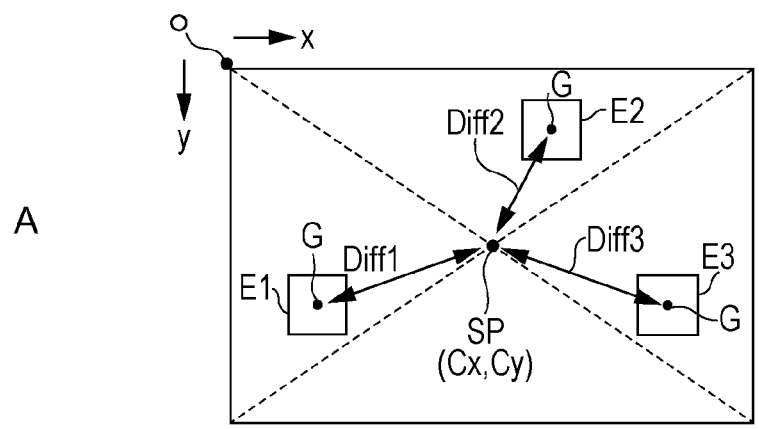
A
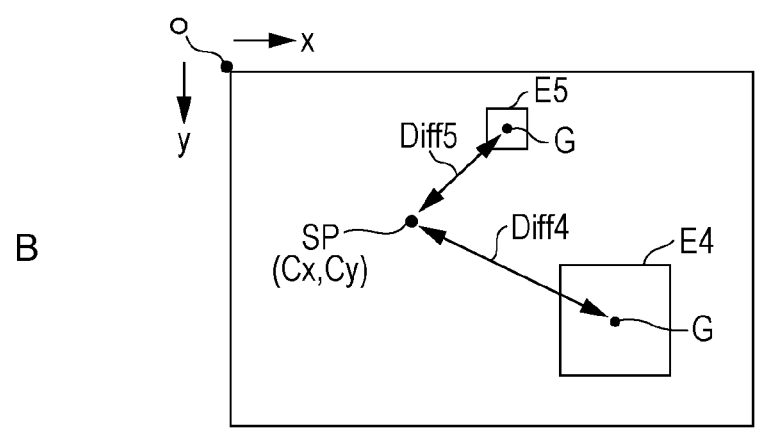
B

FIG. 12
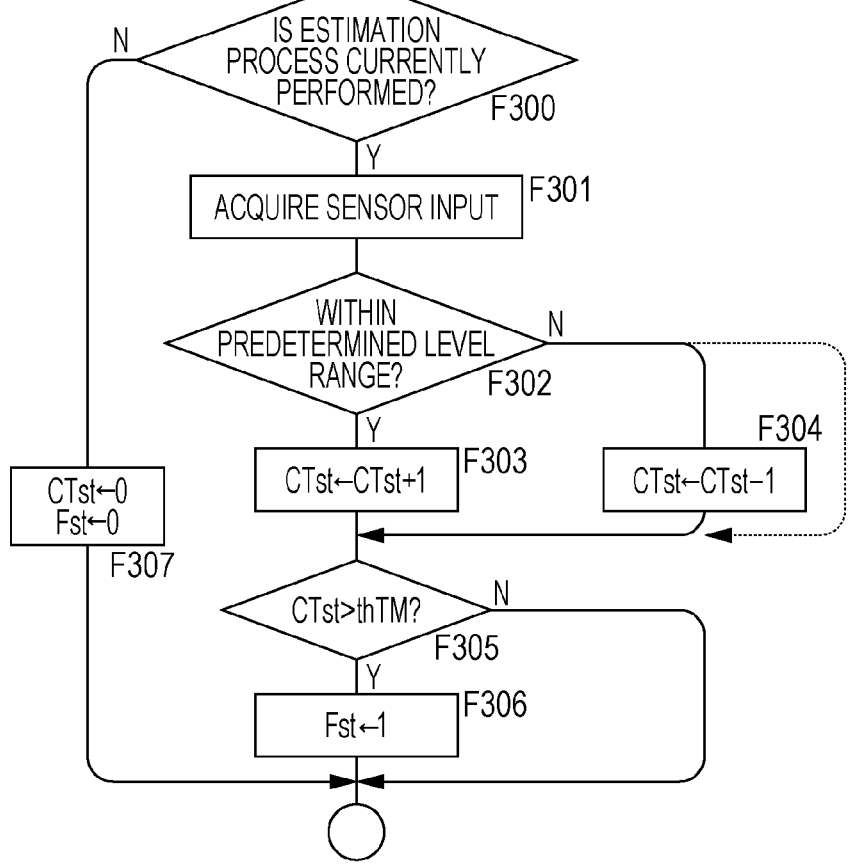
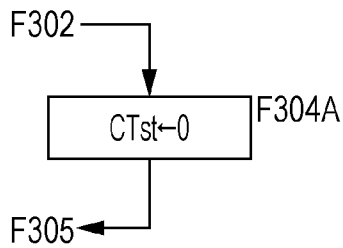

FIG. 13
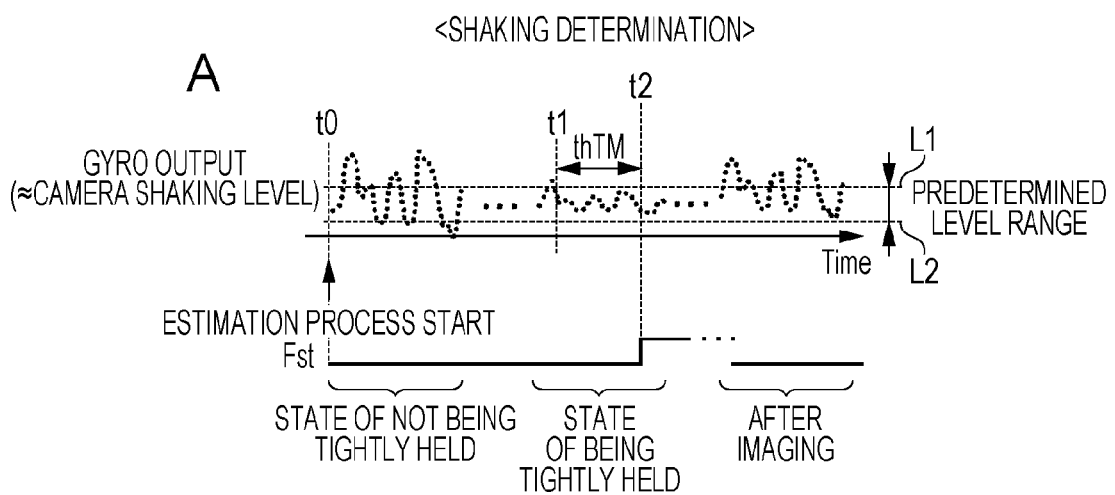
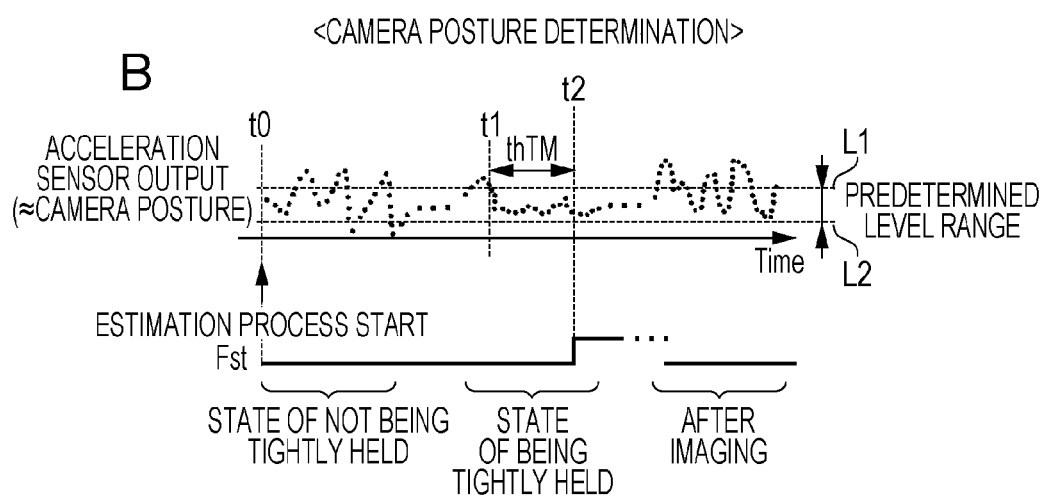

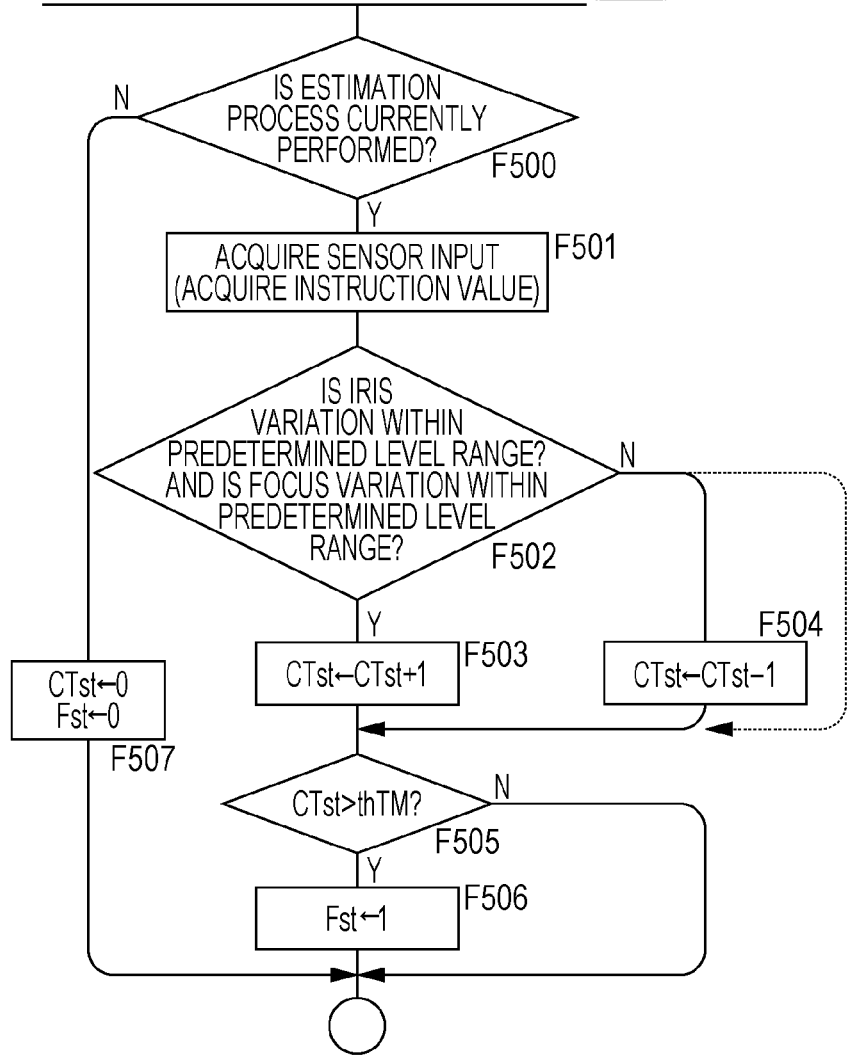
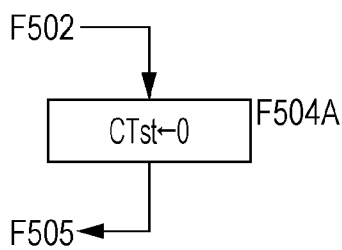
FIG. 16

FIG. 18
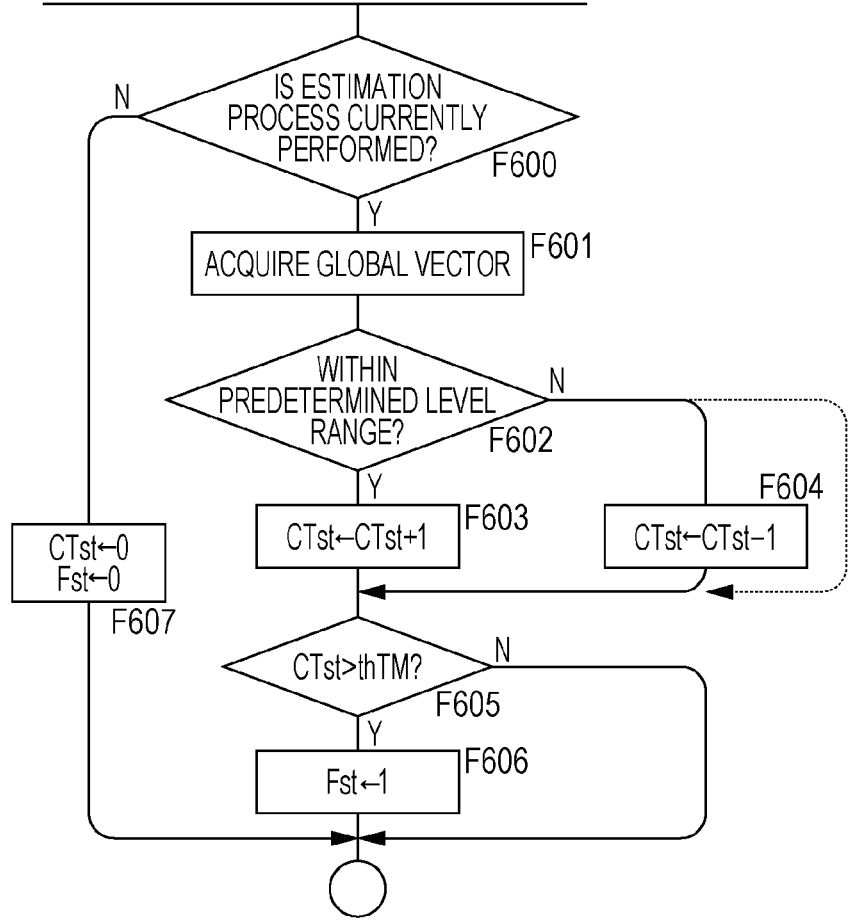
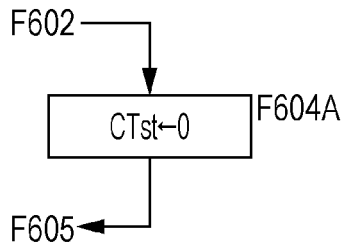

FIG. 19
A 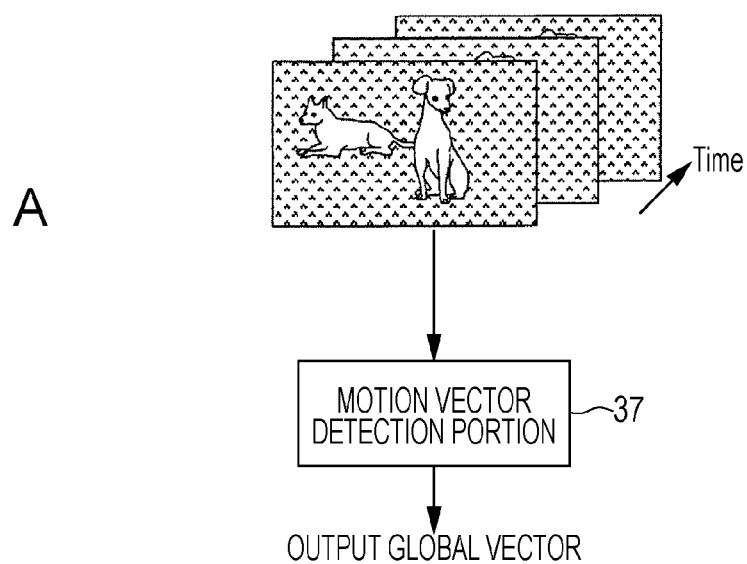
B 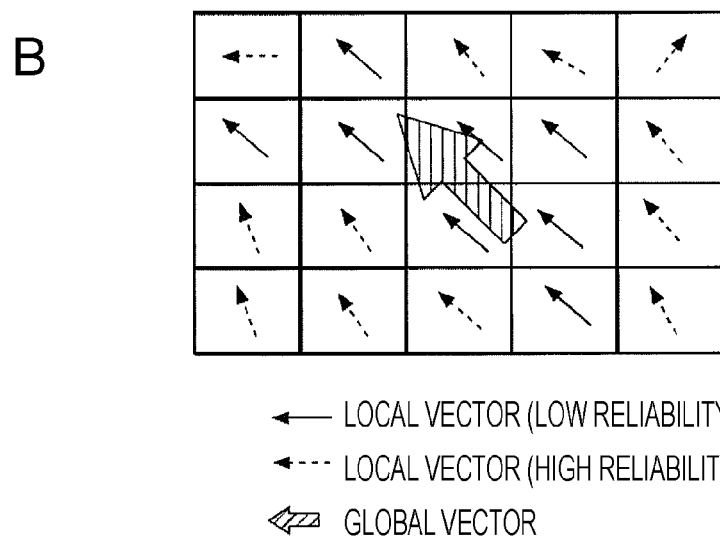

FIG. 21

| CASE | PREDETERMINED TIME thTM |
|---|---|
| PREDETERMINED PERIOD AFTER POWER-ON | thTM1 |
| PREDETERMINED PERIOD AFTER TRANSITION FROM REPRODUCTION MODE TO CAMERA MODE | thTM1 |
| DURING CAMERA MODE (BEFORE INITIAL MAIN SUBJECT DETERMINATION IS PERFORMED) | thTM2 |
| DURING CAMERA MODE (AFTER MAIN SUBJECT DETERMINATION IS PERFORMED ONCE OR MORE) | thTM3 |
| DURING CAMERA MODE (CASE WHERE MAIN SUBJECT DETERMINATION IS NOT PERFORMED DURING CERTAIN PERIOD) | thTM2 | thTM1 > thTM2 > thTM3

IMAGE PROCESSING DEVICE, IMAGE PROCESSING METHOD, AND PROGRAM INCLUDING STABLE IMAGE ESTIMATION AND MAIN SUBJECT DETERMINATION

CROSS REFERENCE TO RELATED APPLICATIONS

This is a U.S. National Stage Application under 35 U.S.C. § 371, based on International Application No. PCT/JP2013/055609, filed Feb. 22, 2013, which claims priority to Japanese Patent Application JP 2012-052453, filed Mar. 9, 2012, each of which is hereby incorporated by reference in its entirety.

TECHNICAL FIELD

The present disclosure relates to an image processing device which performs a process regarding a main subject in an image, an image processing method, and a program.

CITATION LIST

Patent Literature

PTL 1: Japanese Unexamined Patent Application Publication No. 2011-166305
PTL 2: Japanese Unexamined Patent Application Publication No. 2011-146826
PTL 3: Japanese Unexamined Patent Application Publication No. 2011-146827
PTL 4: Japanese Unexamined Patent Application Publication No. 2011-160379

BACKGROUND ART

Recent digital still cameras and digital video cameras normally have a face detection function, and have a function of optimally adjusting parameters such as a focus of a camera and brightness so as to match a position or a region of a face.

Meanwhile, PTL 1 discloses a method in which a "main subject" which is a target of subject tracking is selected in a captured image through a user's designation.

In addition, for example, if techniques disclosed in PTLs 2, 3 and 4 are used, it is possible to realize subject tracking so as to enclose a whole body border of any subject.

Further, there is also a function in which automatic focusing/automatic exposure or the like is used to detect/track a desired region in a captured image, and an optical system or the like is controlled so that the region becomes the most suitable.

As mentioned above, the technique is known in which an image designated by a user as a main subject, for example, an image region such as a face is tracked, or the face region is focused.

SUMMARY OF INVENTION

Technical Problem

Meanwhile, in the current state, a desired region which is a tracking or focusing target in a captured image, that is, a "main subject" is determined by a photographer selecting one candidate in any method from among "a plurality of candidate regions" which are obtained from various detectors.

For example, a main subject is chosen by an action in which any face is selected by using a touch panel from among a plurality of faces which are reflected in a through image (a subject monitoring image displayed at a non-shutter-operation-time) displayed as a screen. Alternatively, a subject located in a predetermined region is selected as a main subject at a timing designated by a user, for example, shutter half-pressing or the like.

However, in practical use cases, when this user interface is considered, the action itself such as "selection of a main subject by a photographer" is often difficult.

For example, a user desires the function to be used in order to keep focusing on a subject which moves around, but it is hard for the user to select the subject while holding a camera and aiming at the subject.

For example, designation may be difficult due to a reaction speed of a user for a variation or a movement of a subject. For example, the case is a case where a subject which moves around cannot be designated well on a screen of a through image.

In addition, an action itself in which a user selects a main subject with the finger is inherently difficult in circumstances in which the user holds a camera in his/her hand and chooses a subject in a state of directing toward the subject.

Further, it may be difficult for a user to select a subject due to a resolution of a display screen where a touch panel is disposed. Furthermore, a desired subject may not be appropriately designated due to a subject size on a display screen where the touch panel is disposed and a size or a thickness of the finger of the user.

Moreover, it may be difficult for a user to appropriately designate a subject due to a time lag on a camera system, for example, a time lag between a practical scene and a through image of a captured image.

In addition, in a case where this operation is performed during capturing or recording of moving images, image blur due to an action of selecting a main subject is recorded as it is, or an action of reselection is forced to be performed at the time of frame-out or disappearance of a main subject due to temporary shielding, that is, at the time of failure of tracking.

As mentioned above, in a small-sized camera, an action itself of selecting a main subject is difficult in many use cases of needing the action, and gives a photographer stress.

Therefore, an object of the present disclosure is to realize a technique of determining a target subject desired by a user as a main subject at an appropriate time even if the user such as a photographer does not perform an action of selecting the subject.

Solution to Problem

An image processing device of the present disclosure includes a stable imaging state estimation portion that performs a stable imaging state estimation process of estimating whether or not a stable imaging state occurs; and a main subject determination portion that performs a main subject determination process, and also outputs a result of the main subject determination process when it is estimated that the stable imaging state occurs due to the stable imaging state estimation process.

An image processing method of the present disclosure includes a stable imaging state estimation step of performing a stable imaging state estimation process of estimating whether or not a stable imaging state occurs; a main subject determination step of performing a main subject determination process; and an output step of outputting a result of the main subject determination process when it is estimated that the stable imaging state occurs due to the stable imaging state estimation process.

A program of the present disclosure causes an arithmetic processing device to perform the respective steps.

According to the technique of the present disclosure, the main subject determination process of automatically determining a main subject with respect to image data is performed. As a process of a prior step thereto, the stable imaging state estimation process of estimating whether or not a stable imaging state occurs is performed. In addition, in a case where it is estimated that the stable imaging state occurs, for example, the main subject determination process is performed so as to output a determination result or to output a main subject determination result which is obtained when it is estimated that the stable imaging state occurs. The stable imaging state is a state which is suitable to perform the main subject determination process since a subject image is stable.

Advantageous Effects of Invention

According to the present disclosure, a determination result of a main subject in a captured image is output when a stable imaging state occurs. Accordingly, a user such as a photographer is not required to perform an action of selecting a main subject, and main subject information can be used at an appropriate timing.

BRIEF DESCRIPTION OF DRAWINGS

FIG. 6 is a diagram illustrating a distance between the candidate image border and the determination reference point according to the embodiment.

FIG. 12 is a flowchart illustrating a processing example 2 according to the embodiment.

FIG. 13 is a diagram illustrating an operation in the processing example 2 according to the embodiment.

FIG. 16 is a flowchart illustrating a processing example 4 according to the embodiment.

FIG. 18 is a flowchart illustrating a processing example 5 according to the embodiment.

FIG. 19 is a diagram illustrating a global vector in the processing example 5 according to the embodiment.

FIG. 21 is a diagram illustrating a change of a predetermined time according to the embodiment.

DESCRIPTION OF EMBODIMENTS

Figure 1:
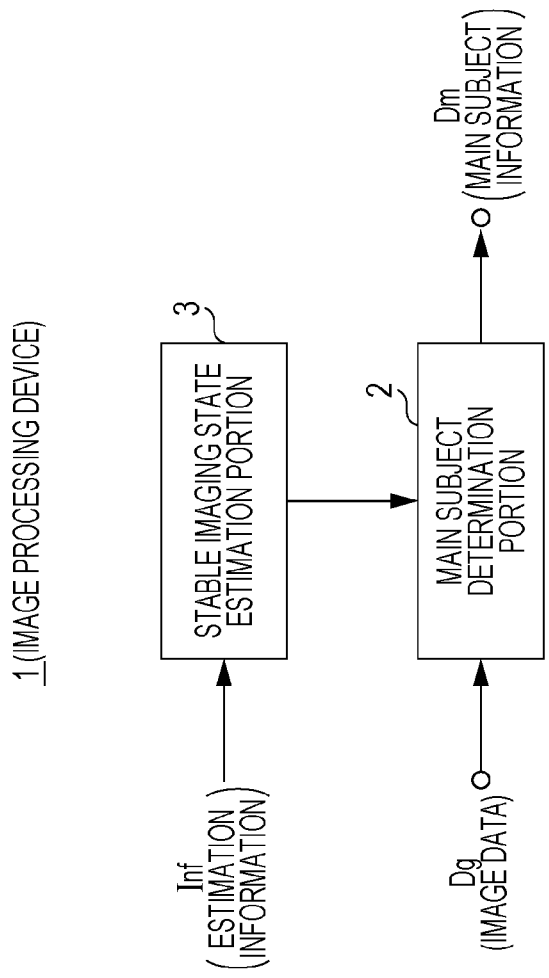
FIG. 1 is a block diagram illustrating a configuration example of an image processing device according to an embodiment of the present disclosure.

Hereinafter, an embodiment will be described in the following order.
<1. Configuration of image processing device>
<2. Configuration of imaging apparatus>
<3. Main subject determination process>
<4. Stable imaging state estimation process>
[4-1: Execution opportunity of stable imaging state estimation process]
[4-2: Processing example 1]
[4-3: Processing example 2]
[4-4: Processing example 3]
[4-5: Processing example 4]
[4-6: Processing example 5]
[4-7: Predetermined time changing process used in estimation process]
<5. Another processing example in image processing device>
<6. Application to program and computer apparatus>
<7. Modification examples>

In addition, meanings of the terms "stable imaging state", "degree of stable presence", and "imaging field of view" used in description will be mentioned.

The "degree of stable presence" is a value serving as an index of automatic main subject determination. In other words, the degree of stable presence is assumed to be a value indicating a frequency in which a certain subject is positionally in a predetermined state in an angle-of-view space. For example, the degree of stable presence is an index value for determining whether or not a subject is in a predetermined state in an image with temporally high accuracy. When described on the basis of the embodiment described later, the degree of stable presence is a value indicating a cumulative time, duration, a degree of average presence, or the like in which a candidate image is in a predetermined position state as a position state in an angle-of-view space, and, an image with, for example, much cumulative time or a long duration which is calculated as the "degree of stable presence" is assumed to be estimated as a main subject at which is mainly being aimed by a photographer.

In addition, the above-described "angle-of-view space" indicates a space appearing a captured image. The angle-of-view space indicates a two-dimensional space as a screen plane in a captured image, or a three-dimensional space including a relative distance of a subject for a camera position during photographing.

The "stable imaging state" indicates a state or circumstances suitable to perform a main subject determination process or to use a main subject determination result. Although different depending on a relative relationship between an imaging apparatus and a subject in various expected cases, the main subject determination process is a meaningful process if a variation in captured image content is small, and a period lasts when a captured image is stabilized to some extent.

For example, in a case of a small-sized camera, circumstances in which a user is looking for a subject while holding the camera are the stable imaging state. For example, the stable imaging state is a state in which an imaging apparatus 10 is stably held, such as circumstances of being looking for a subject in order to capture a still image thereof.

In the present embodiment, as a starting condition of an automatic main subject determination process, a "stable imaging state estimation process" is performed, but this is a process of estimating whether or not performing a main subject stabilization process is appropriate. For example, in a case of the small-sized camera, the "stable imaging state estimation process" is a process of determining whether or not the user is in an operation state which can be estimated as circumstances of being looking for a subject while holding the camera.

The "imaging field of view" indicates a subject scene in a range shown in a captured image. An imaging field-of-view variation indicates various variations in a captured image which are appearing on a time axis in captured image data. For example, the variations indicate various variations appearing in image data, such as a variation in an angle of view of a captured image, a variation in a subject azimuth, a variation in a subject range due to shaking or a camera posture, image quality variations such as luminance, colors, and contrast, and a variation in a focusing state. A case where the imaging field-of-view variation is within a predetermined range, that is, a case where it can be determined that the imaging field of view is stable can be estimated as the "stable imaging state".

1. Configuration of Image Processing Device

FIG. 1 illustrates a configuration example of an image processing device according to an embodiment.

An image processing device 1 includes a main subject determination portion 2 and a stable imaging state estimation portion 3.

The stable imaging state estimation portion 3 performs a stable imaging state estimation process of estimating whether or not a stable imaging state occurs.

The main subject determination portion 2 performs a main subject determination process.

The main subject determination portion 2 outputs a result of the main subject determination process in a case where it is estimated that a stable imaging state occurs due to the stable imaging state estimation process of the stable imaging state estimation portion 3.

For example, the main subject determination portion 2 performs the main subject determination process and outputs a determination result in a case where it is estimated that a stable imaging state occurs.

Alternatively, the main subject determination portion 2 may sequentially perform the main subject determination process, and may output the latest main subject determination result which is obtained when it is estimated that a stable imaging state occurs.

The stable imaging state estimation portion 3 performs the stable imaging state estimation process regarding whether or not a current state is estimated as a stable imaging state, by using input estimation information Inf. The estimation information Inf may be various information pieces, for example, elapsed time information, a sensor output for detecting a behavior of an imaging apparatus, control values or instruction values of various operations of the imaging apparatus, a sensor output for detecting a motion of an imaging optical system, image analysis information, and the like.

The stable imaging state estimation portion 3 performs an estimation process by using the estimation information Inf, and notifies the main subject determination portion 2 that a stable imaging state has been estimated to occur in a case where the stable imaging state has been estimated to occur.

The main subject determination portion 2 performs the stable imaging state estimation process as in the following examples in response to, for example, a notification of estimation of a stable imaging state.

The main subject determination portion 2 has, for example, a candidate detection function and a main subject determination process function as arithmetic processing functions which are realized by a software program.

The main subject determination portion 2 first performs candidate detection by using the candidate detection function.

The candidate detection is a process of detecting candidate images serving as candidates of a main subject from a plurality of frames of input image data Dg.

In other words, face image detection or human body image detection is performed on frames of the image data Dg which are continuously input on the time axis, or intermittent frames, and extracts images serving as candidates of a main subject therefrom.

In addition, the face detection, the human body detection, or the like can be performed by using a pattern matching method in image analysis on captured image data, and other detectors can be realized in principle if a dictionary used for pattern matching is replaced. For example, candidate images of a main subject may be extracted for the purpose of dog's eye detection, cat's eye detection, or the like.

Further, for example, a moving body may be detected in a moving body detection method using a frame difference, and the moving body may be used as a candidate image, and, in this case, an interest region extraction method called saliency may be used.

Furthermore, the main subject determination portion 2 sets information indicating a candidate image extracted due to the candidate detection process, for example, positional information (x and y coordinate values) in a two-dimensional direction in a screen of the candidate image, a subject distance, an image size, and the like, as candidate image information.

The main subject determination portion 2 successively performs main subject setting based on calculation of a degree of stable presence, by using the main subject determination process function.

In other words, the main subject determination portion 2 obtains a degree of stable presence in image data over a plurality of frames in relation to the candidate images indicated by the candidate image information obtained due to the candidate detection, and determines a main subject among the candidate images. In addition, main subject information Dm is output.

First, the main subject determination portion 2 determines a position state in an angle-of-view space in relation to the candidate images indicated by the candidate image information.

The "position state" collectively indicates circumstances of an absolute or relative position in the angle-of-view space of a captured image in image data.

Specific examples of the "position state" include
a relative distance from a certain determination reference point in the angle-of-view space
a relative positional relationship or a relative distance for a certain determination reference region in the angle-of-view space
a position of a candidate image in a two-dimensional plane of a captured image
a relative distance of a subject for a camera position during imaging
a relative positional relationship between the subject distance and the determination reference point or the determination reference region, and the like.

Next, a degree of stable presence for each candidate image in the image data over the plurality of frames is obtained from the position state of the candidate image in each determined frame.

In addition, a process is performed in which a main subject is determined from among the respective candidate images by using the degree of stable presence obtained due to the degree-of-stable-presence calculation function, so as to set a certain candidate image as the main subject.

As mentioned above, information indicating an image set as the main subject is output as main subject information Dm, and is sent to other application software, processing circuit portions, or the like.

In addition, the image processing device 1 including the main subject determination portion 2 and the stable imaging state estimation portion 3 may be realized by a central processing unit (CPU) or a digital signal processor (DSP) as an arithmetic processing device.

A flow of a process performed by the image processing device 1 is as in FIG. 2A.

In step F1000, a stable imaging state estimation process is performed by the stable imaging state estimation portion 3. As described above, the stable imaging state estimation portion 3 determines whether or not a current state is estimated as a stable imaging state by using the input estimation information Inf.

Here, if it is not estimated that a stable imaging state occurs in the stable imaging state estimation process of step F1000, the process of FIG. 2A of the image processing device 1 finishes in step F1001. Then, the process starts again from step F1000.

On the other hand, if it is estimated that the stable imaging state occurs in the stable imaging state estimation process of step F1000, the image processing device 1 determines this as being a start timing of a main subject determination process in step F1001. In addition, the flow proceeds to step F1002, and the main subject determination process is performed by the main subject determination portion 2.

First, in step F1002, the above-described candidate image detection starts.

For example, image data Dg is input from an imaging apparatus portion (not illustrated), or a reception portion or the like which receives image data transmitted from a separate imaging apparatus. Alternatively, there is a case where moving image data which is acquired by the imaging apparatus and is reserved in a recording medium is reproduced and is input.

In step F1002, the main subject determination portion 2 performs image analysis, frame difference detection, interest region detection, and the like with respective frames of the image data Dg which are sequentially input as targets, so as to start a process of detecting predetermined candidate images.

The main subject determination portion 2 may perform candidate image extraction with all the input frames as targets, and may perform the candidate image extraction with intermittent frames such as every other frame or every two frames as targets. In other words, the main subject determination portion 2 may perform the candidate image extraction process on a plurality of frames at least on a time series in a period of performing the main subject determination. An image which will be used as a candidate image is changed depending on settings, and may be, for example, a face image, a human body image, a dog image, a cat image, or the like.

In addition, the main subject determination portion 2 generates candidate image information indicating the detected candidate image for each frame.

Next, in step F1003, the main subject determination portion 2 performs a main subject determination process.

With reference to FIG. 2B, step F1003 will be described in detail.

First, in step F1, the main subject determination portion 2 performs a position state determination process. This process is a process of determining a position state of each candidate image which is previously generated.

The candidate image may be present in one or a plurality of frames following a single frame, and the candidate image may not be present in a frame. In a case where a plurality of candidate images are present in a frame, a position state is determined for each candidate image.

Next, in step F2, the main subject determination portion 2 calculates a degree of stable presence for each candidate image in image data over a plurality of frames, from the position state of the candidate image in each frame, determined in the position state determination process. For example, the degree of stable presence is calculated as a value or the like indicating a frequency in which a position state is a state close to an image center.

In step F3, the main subject determination portion 2 determines a main subject from among the candidate images by using the degree of stable presence for each candidate image. For example, a candidate image for which the degree of stable presence as a value or the like indicating a frequency in which a position state is a state close to an image center is the highest value or reaches a predetermined value in the shortest time, is determined as being a main subject.

In step F1003 of FIG. 2A, the main subject determination portion 2 performs steps F1 to F3 of FIG. 2B as mentioned above, and sets, for example, a single candidate image as a main subject.

In addition, in step F1004 of FIG. 2A, the main subject determination portion 2 sends main subject information Dm to an application program or the like.

The application program or the like performs processes corresponding to the fact that an image set as the main subject has been specified. For example, the processes include focus control, a tracking process, an image effect process, and the like.

As mentioned above, in the main subject determination process performed by the image processing device 1, the main subject determination process is performed when it is estimated that a stable imaging state occurs due to the stable imaging state estimation process.

For this reason, a timing suitable to determine a main subject is determined in a form of estimation of a stable imaging state, and thus a main subject determination process can be performed at an appropriate time.

For example, a state in which a photographer having a camera holds the camera with the intention of imaging is estimated as a stable imaging state. It is suitable to start the main subject determination process in this case. Conversely speaking, it is no use performing the main subject determination process, especially, in a case where a user does not hold a camera.

In the image processing device 1 of this example, a state in which a photographer has intention of imaging, for example, circumstances in which the photographer tries to look for a subject is estimated through the stable imaging state estimation process, and the main subject determination process is performed at an appropriate timing based on the estimation, that is, a timing which is desirable to the user and when a useless process is not performed.

In addition, in the main subject determination process, a degree of stable presence of a subject in a plurality of frames is obtained from extracted candidate images. In other words, an index value for determining whether or not a subject is positionally stably present in an image at a temporally high frequency is obtained. For example, a subject which is considered as a target at which a photographer holding a camera aims with high accuracy has a high degree of stable presence. That is, a subject at which the photographer mainly aims is made to be included in an image so as to be a point or a region which is considered as a center by the photographer as a position in the captured image, and, if the photographer aims at the subject, the subject is naturally included in the captured image for a long time. Therefore, the subject having a high degree of stable presence, which is positionally stable and is present in a captured image at a temporally high frequency, can be estimated as a main subject at which the photographer aims.

A main subject is determined on the basis of such degree of stable presence. Accordingly, a main subject is automatically determined without a user such as a photographer intentionally performing a designation operation, and thus user's operability in various electronic apparatuses which perform operations corresponding to setting of the main subject is considerably improved.

2. Configuration of Imaging Apparatus

Hereinafter, a detailed description will be made of a stable imaging state estimation operation and a main subject determination operation by exemplifying an imaging apparatus 10 including the above-described image processing device.

Figure 3:
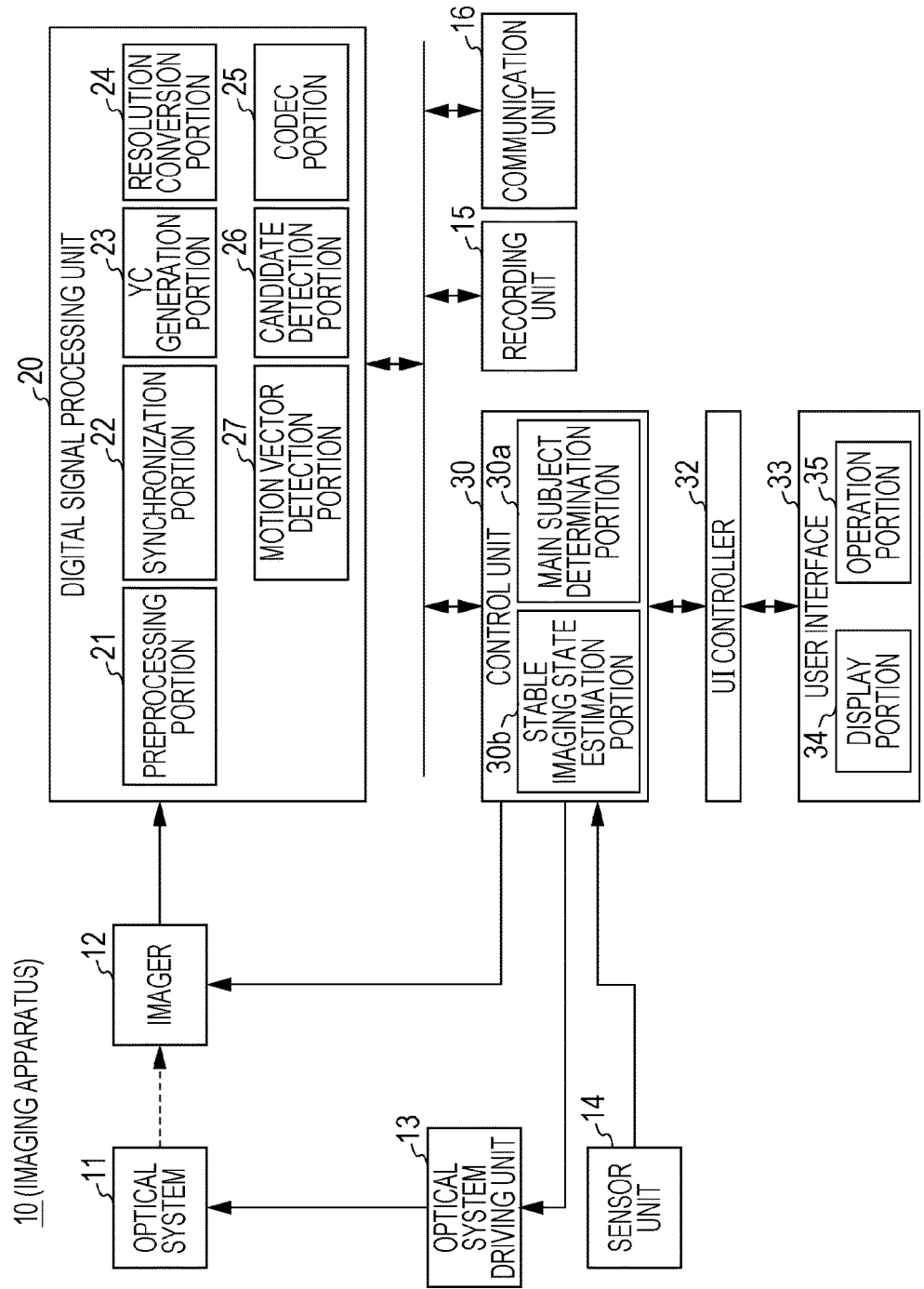
FIG. 3 is a block diagram illustrating an imaging apparatus according to the embodiment.

FIG. 3 illustrates a configuration example of the imaging apparatus 10 of an embodiment. The imaging apparatus 10 is a so-called digital still camera or a digital video camera, and is an apparatus which captures and/or records a still image or a moving image and includes an image processing device recited in the claims.

In addition, constituent elements corresponding to the above-described main subject determination portion 2 and stable imaging state estimation portion 3 of the image processing device are implemented by software in a control unit 30 of the imaging apparatus 10. In FIG. 3, a main subject determination portion 30a and a stable imaging state estimation portion 30b are illustrated. The control unit 30 performs a process based on a program recited in the claims so as to perform an operation as an image processing method recited in the claims.

As illustrated in FIG. 3, the imaging apparatus 10 includes an optical system 11, an imager 12, an optical system driving unit 13, a sensor unit 14, a recording unit 15, a communication unit 16, a digital signal processing unit 20, the control unit 30, a user interface controller (hereinafter, referred to as a "UI controller") 32, and a user interface 33.

The optical system 11 includes lenses such as a cover lens, a zoom lens, and a focus lens, and a diaphragm mechanism. Light is collected at the imager 12 by the optical system 11.

The imager 12 includes an imaging device of, for example, a charge coupled device (CCD) type, a complementary metal oxide semiconductor (CMOS) type, or the like.

The imager 12 performs, for example, a correlated double sampling (CDS) process, an automatic gain control (AGC) process, and the like, and further performs analog/digital (A/D) conversion process, on an electrical signal obtained through photoelectric conversion in the imaging device. In addition, an imaging signal as digital data is output to the digital signal processing unit 20 in the subsequent stage.

The optical system driving unit 13 drives the focus lens of the optical system 11 under the control of the control unit 30 so as to perform a focusing operation. In addition, the optical system driving unit 13 drives the diaphragm mechanism of the optical system 11 under the control of the control unit 30 so as to perform exposure adjustment. Further, the optical system driving unit 13 drives the zoom lens of the optical system 11 under the control of the control unit 30 so as to perform a zooming operation.

The digital signal processing unit 20 is formed as an image processing processor by using, for example, a DSP. The digital signal processing unit 20 performs various signal processes on a captured image signal from the imager 12.

For example, the digital signal processing unit 20 includes a preprocessing portion 21, a synchronization portion 22, a YC generation portion 23, a resolution conversion portion 24, a codec portion 25, a candidate detection portion 26, and a motion vector detection portion 27.

The preprocessing portion 21 performs a clamp process of clamping black levels of R, G, and B to predetermined levels, a correction process between color channels of R, G, and B, or the like, on the captured image signal from the imager 12. The synchronization portion 22 performs a demosaic process so that image data for each pixel has all color components of R, G, and B. The YC generation portion 23 generates a luminance (Y) signal and a color (C) signal from the image data of R, G, and B. The resolution conversion portion 24 performs a resolution conversion process on the image data having undergone the various image processes. The codec portion 25 performs, for example, a coding process for recording or communication, on the image data whose resolution has been converted.

The candidate detection portion 26 corresponds to a candidate detection function of the main subject determination portion 2 described in FIG. 1. In the example of FIG. 3, the candidate detection portion 26 is a functional configuration executed by the digital signal processing unit 20, but this is an example, and a process of the candidate detection portion 26 may be performed by the main subject determination portion 30a of the control unit 30.

The candidate detection portion 26 performs, for example, an image analysis process in the frame unit with a captured image signal such as a luminance signal or a color signal obtained by the YC generation portion 23 as a target, so as to extract a candidate image. For example, a face image is detected, and a region where the face image is present is extracted as a candidate image border. As for the extracted candidate image, positional information such as xy coordinate values and a subject distance on a screen of the candidate image border, or size information such as a width, a height, and the number of pixels of the candidate image border is sent to the main subject determination portion 30a of the control unit 30 as candidate image information. In addition, here, since the candidate image information is information indicating a border of an image region serving as a candidate image, the candidate image information is also referred to as "candidate image border information".

In addition, the candidate image border information may include the type of attribute information such as a face, a human body, a dog, or a cat of a candidate image, individual identification information, or image data itself.

As described above, the candidate detection portion 26 may extract a specific image serving as a candidate target in a pattern matching method, and may detect a moving body and set the moving body as a candidate image, for example, in a moving body detection method using a frame difference. Methods of extracting and choosing a candidate image are not limited to the above methods, and may be various. In addition, the candidate detection portion 26 may perform a process such as a smoothing process or an outlier removal process on an image so as to generate candidate image border information.

The motion vector detection portion 27 is a functional configuration which is provided in a case where a processing example 5 described later is employed. Although described in detail in the processing example 5, the motion vector detection portion 27 performs, for example, an image analysis process in the unit of frames with a captured image signal obtained by the YC generation portion 23 as a target, so as to obtain a vector (global vector) of an entire image from motion vectors (local vectors) of a plurality of respective areas into which a screen is divided.

The motion vector detection portion 27 sends the global vector to the stable imaging state estimation portion 30b of the control unit 30 in order to perform a stable imaging state estimation process.

Further, in the example of FIG. 3, the motion vector detection portion 27 is a functional configuration executed by the digital signal processing unit 20, but this is an example, and the stable imaging state estimation portion 30b of the control unit 30 may perform a process of the motion vector detection portion 27.

The control unit 30 is constituted by a microcomputer including a CPU, a read only memory (ROM), a random access memory (RAM), a flash memory, and the like.

The CPU executes a program stored in the ROM, the flash memory, or the like so that the imaging apparatus 10 is collectively controlled.

The RAM is used to temporarily store data, a program, or the like as a work area when the CPU performs various data processes.

The ROM or a nonvolatile memory is used to store not only an operating system (OS) for the CPU controlling the respective constituent elements or content files such as image files, but also application programs for various operations or firmware. In this example, for example, a program for performing a main subject determination process described later, an application program using a main subject determination result, and the like are stored.

Therefore, the control unit 30 controls an operation of each necessary constituent element in relation to instructions of various signal processes in the digital signal processing unit 20, an imaging operation or a recording operation responding to a user's operation, a reproduction operation of a recorded image file, camera operations such as zooming, focusing, and exposure adjustment, a user interface operation, and the like.

In addition, in the present embodiment, the control unit 30 functions as the main subject determination portion 30a, and performs a main subject determination process described later.

The main subject determination portion 30a performs a position state determination process, a degree-of-stable-presence calculation process, and a main subject setting process based on a degree of stable presence, on candidate image information sent from the candidate detection portion 26.

Further, in the present embodiment, the control unit 30 functions as the stable imaging state estimation portion 30b, and performs a stable imaging state estimation process described later.

The stable imaging state estimation portion 30b determines whether or not it is estimated that a stable imaging state occurs on the basis of an elapsed time, various sensor information pieces, a control instruction value, and the like.

The user interface 33 performs a display output or a sound output to a user, and receives an operation input from the user. For this reason, the user interface includes a display device, an operation device, a speaker device, a microphone device, and the like. Here, a display portion 34 and an operation portion 35 are illustrated.

The display portion 34 performs a variety of display to a user, and includes, for example, a display device such as a liquid crystal display (LCD) or an organic electroluminescence (EL) display formed on a casing of the imaging apparatus 10. In addition, the display portion may be configured by using the LCD, the organic EL device, or the like, in a form of a so-called view finder.

The display portion 34 includes the display device and a display driver which causes the display device to perform display. The display driver performs a variety of display on the display device on the basis of an instruction from the control unit 30. For example, the display driver reproduces and displays a still image or a moving image which has been captured and recorded on a recording medium, or displays a through image (subject monitoring image) which is captured when waiting for a shutter operation, on a screen of the display device. In addition, graphical user interfaces (GUIs) such as various operation menus, icons, and messages are displayed on the screen. In the present embodiment, display is also performed so that a determination result due to main subject determination can be understood by a user on, for example, a through image or a reproduced image.

The operation portion 35 has an input function of receiving a user's operation, and sends a signal responding to an input operation to the control unit 30.

The operation portion 35 is implemented by, for example, various operators provided on the casing of the imaging apparatus 10, a touch panel formed in the display portion 34, or the like. As the operators on the casing, a reproduction menu start button, a determination button, a cross key, a cancel button, a zoom key, a slide key, a shutter button, and the like are provided. In addition, various operations may be performed through a touch panel operation using icons, menus, or the like displayed on the touch panel and the display portion 34.

An operation of the display portion 34 or the like of the user interface 33 is controlled by the UI controller 32 in response to an instruction from the control unit 30. In addition, operation information using the operation portion 35 is transmitted to the control unit 30 by the UI controller 32.

The recording unit 15 includes, for example, a nonvolatile memory, and functions as a storage region which stores content files such as still image data or moving image data, attribute information of an image file, a thumbnail image, and the like.

The image file is stored in a format such as Joint Photographic Experts Group (JPEG), Tagged Image File Format (TIFF), or Graphics Interchange Format (GIF).

A practical form of the recording unit 15 may be various. For example, the recording unit 15 may be in a form of a flash memory built into the imaging apparatus 10, and may be in a form of a memory card attachable to and detachable from the imaging apparatus 10, for example, a portable flash memory and a card recording/reproduction portion which performs recording/reproduction access to the flash memory. In addition, the recording unit may be realized by a hard disk drive (HDD) as the form of being built into the imaging apparatus 10.

Further, in this example, a program for performing a stable imaging state estimation process and a main subject determination process described later may be stored in the recording unit 15.

The communication unit 16 performs data communication or network communication with an external apparatus in a wired or wireless manner. For example, communication of captured image data (a still image file or a moving image file) is performed with external display devices, recording devices, reproduction devices, and the like.

In addition, communication may be performed by using, for example, various networks such as the Internet, a home network, and a local area network (LAN) as the network communication unit, so as to transmit and receive various data to and from a server and a terminal on the network.

The sensor unit 14 comprehensively includes various sensors. For example, a gyro sensor detecting camera shaking, an acceleration sensor detecting a posture of the imaging apparatus 10, and the like are provided. In addition, an angular velocity sensor detecting a posture or movement of the imaging apparatus 10, an illuminance sensor detecting ambient illuminance for exposure adjustment, and a range sensor detecting a subject distance may be provided. A panning/tilting operation of the imaging apparatus 10 can be detected depending on an acceleration sensor or an angular velocity sensor.

In addition, there are cases where a zoom lens position sensor detecting a position of the zoom lens of the optical system 11 and a focus lens position sensor detecting a position of the focus lens thereof are provided as the sensor unit 14.

Further, there are cases where a sensor detecting an aperture size of a mechanical iris which is the diaphragm mechanism is provided as the sensor unit 14. The various sensors of the sensor unit 14 transmit detected information to the control unit 30. The control unit 30 can perform various controls by using the information detected by the sensor unit 14.

3. Main Subject Determination Process

First, in the imaging apparatus 10, a main subject determination process performed by the main subject determination portion 30a will be described. A stable imaging state estimation process of determining a condition for the main subject determination process will be described later.

The main subject determination process is a process of obtaining a degree of stable presence in image data over a plurality of frames, and is a process of determining a main subject among candidate images.

An outline of the main subject determination process will be described with reference to FIG. 4, and specific processing examples will be described with reference to FIGS. 5 to 8.

Figure 4:
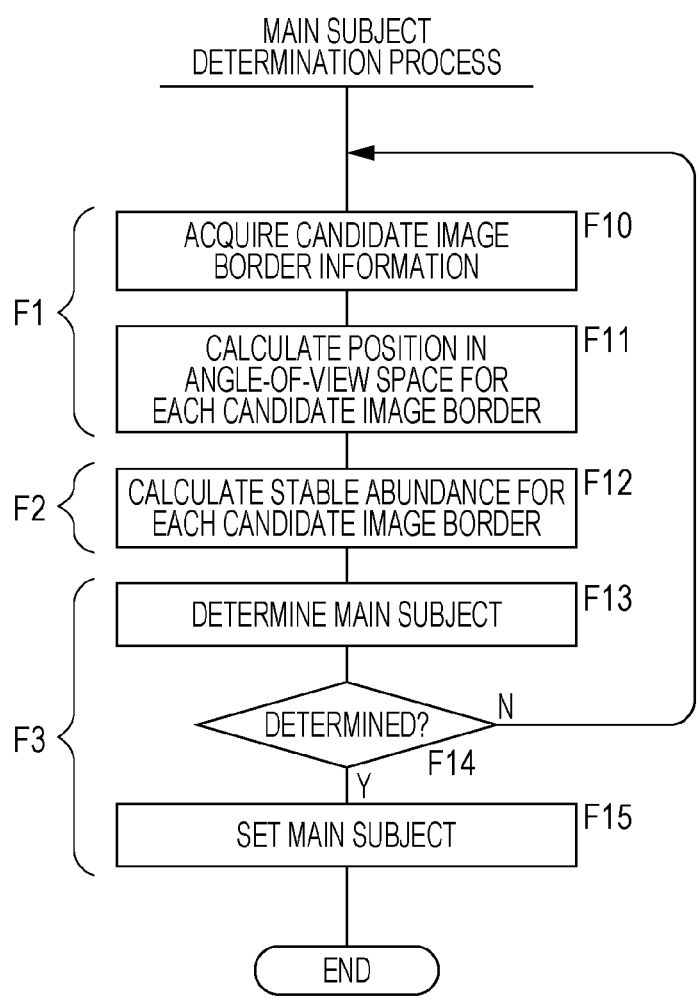
FIG. 4 is a flowchart illustrating a detailed main subject determination process according to the embodiment.

FIG. 4 is a flowchart of the main subject determination process. In addition, FIG. 4 also illustrates a correspondence relationship of processes corresponding to step F1 of determining a position state, step F2 of calculating a degree of stable presence, and step F3 of setting a main subject of FIG. 2B, in relation to steps F10 to F15.

In step F10, the control unit 30 acquires candidate image border information for a certain single frame from the candidate detection portion 26.

In step F11, the control unit 30 determines each position state in one or a plurality of candidate image borders indicated by the acquired candidate image border information.

In this case, as the position state, a distance of a candidate image relative to a determination reference point set in an angle-of-view space is determined. Alternatively, as the position state, a positional relationship of a candidate image relative to a determination reference region set in an angle-of-view space is determined.

In step F12, the control unit 30 calculates a degree of stable presence for each candidate image border. In this case, the control unit 30 calculates cumulative time information when the position state satisfies a predetermined condition as the degree of stable presence. Alternatively, the control unit 30 calculates duration when the position state is kept satisfying a predetermined condition as the degree of stable presence.

In addition, positional information of a candidate image in an angle-of-view space or size information of a candidate image may be used to calculate the degree of stable presence.

In step F13, the control unit 30 determines a main subject by using the degree of stable presence.

Here, the determination performed in step F13 is a process in which a candidate image reaching a predetermined value in the shortest time from the start of the main subject determination is determined as being a main subject. Alternatively, the determination is a process in which a candidate image having the greatest value as a degree of stable presence is determined as being a main subject while the main subject determination is currently performed.

In addition, positional information in an angle-of-view space or size information may be used for the main subject determination along with a value of the degree of stable presence.

At the time when a candidate image whose value of the degree of stable presence reaches a predetermined value is not yet present, or at the time when a predetermined main subject determination period has not yet elapsed and a candidate image with the highest value of the degree of stable presence cannot be chosen yet during the period, a main subject cannot be determined yet in the process in step F13. In this case, the control unit 30 returns to F10 from step F14, and repeatedly performs the respective processes. In other words, the candidate detection portion 26 acquires candidate image border information of a frame which is to be processed next, and performs the same process thereon.

In a case where a candidate image whose value of the degree of stable presence reaches the predetermined value is found at a certain time, or at the time when the predetermined main subject determination period has elapsed and a candidate image with the highest value of the degree of stable presence can be chosen during the period, the control unit 30 proceeds from step F14 to step F15. In addition, the candidate image determined in step F13 is set as a main subject.

In addition, the main subject determination process of FIG. 4 is in a processing aspect in which the determination is performed while candidate image information is acquired during execution of the main subject determination.

As other aspects, candidate image information is acquired during a certain period. In addition, a processing aspect may be considered in which, when the period has elapsed, main subject determination is performed by using the acquired candidate image information.

Next, specific processing examples corresponding to the main subject determination process of FIG. 4 will be described.

In the following specific examples, a distance with a determination reference point set as a position state of a candidate image border is obtained.

In addition, as a degree of stable presence for each candidate image border, cumulative time information is calculated which satisfies a condition in which the distance with the determination reference point is within a predetermined threshold value.

Further, a candidate image whose degree of stable presence reaches a predetermined value earliest from the start of the main subject determination is determined as being a main subject.

Therefore, first, a candidate image border, a distance with a determination reference point, and a degree of stable presence will be respectively described with reference to FIGS. 5, 6 and 7.

Figure 5:
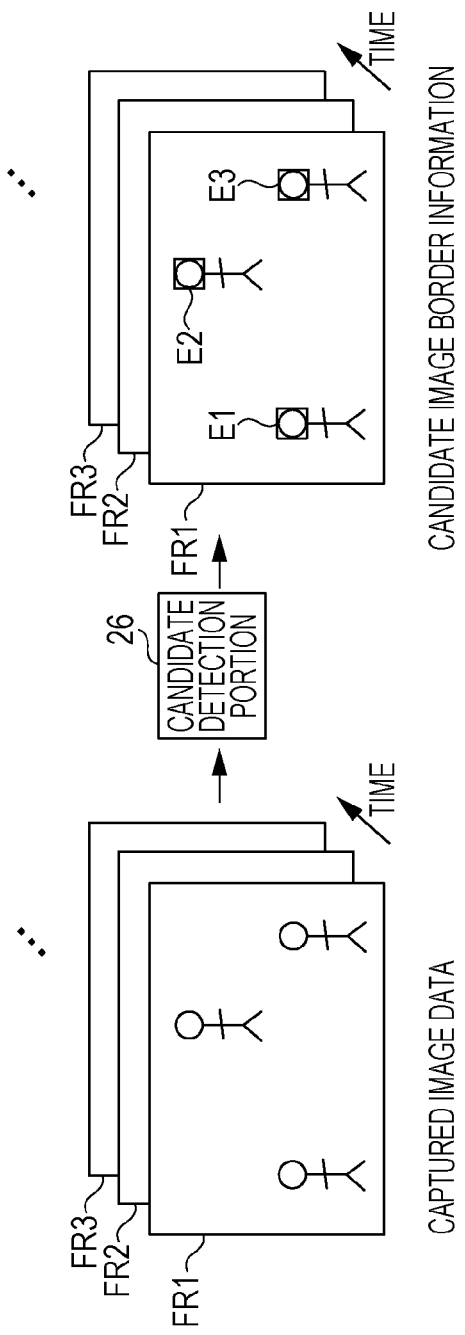
FIG. 5 is a diagram illustrating a candidate image border and a determination reference point according to the embodiment.

FIG. 5 schematically illustrates an operation of extracting a candidate image border, performed by the candidate detection portion 26.

FIG. 5 illustrates respective frames FR1, FR2, FR3, . . . of a captured image signal which is input to the digital signal processing unit 20 due to operations of the optical system 11 and the imager 12 of the imaging apparatus 10. The candidate detection portion 26 detects a candidate image from each of consecutive frames which are sequentially input, or each of intermittent frames.

For example, as illustrated, in a case where three people are in the frame FR1, each face image part is extracted as a candidate image, and candidate image border information on candidate image borders E1, E2 and E3 are output and are sent to the main subject determination portion 30a. The candidate image border information is positional information, size information, attribute information, and the like.

the candidate detection portion 26 extracts candidate images in the same manner for the subsequent frames FR2, FR3, . . . , generates candidate image border information on each candidate image border, and sends the candidate image border information to the main subject determination portion 30a.

The control unit 30 calculates a distance with a determination reference point as a position state for each candidate image border when acquiring the candidate image border information of each frame.

FIG. 6A illustrates an example of a determination reference point SP. This is an example in which an image center is used as the determination reference point SP. In addition, xy coordinate values of the determination reference point SP are set to (Cx,Cy).

Here, distances Diff1, Diff2 and Diff3 of the determination reference point SP from centroids G of the illustrated respective candidate image borders E1, E2 and E3 are calculated.

In addition, the determination reference point SP is not required to be set at the image center.

For example, as in FIG. 6B, the determination reference point SP may be set at a slightly upper left position of the center. This is because, for example, in a case where a composition of a still image is considered, if a main subject is disposed at a position which is not the center, this often leads to proper cases.

Also in this case, in the same method as in FIG. 6A, a distance between the determination reference point SP and the centroid G of the candidate image border is calculated.

The determination reference point SP may be set at the position as, for example, in FIG. 6A or FIG. 6B in a fixed manner, and may be arbitrarily designated by a user's touch operation on a display screen. In addition, several candidate points of determination reference points may be presented to a user on a screen of the display portion 34, so as to be selected by the user. Further, the control unit 30 may determine an optimal position in consideration of a composition or the like according to image content, an image analysis result, and the like, and thus a determination reference point may be automatically set. In other words, the determination reference point SP may be set as follows.

A determination reference point is set at a fixed position set in advance, such as an image central position or a position deviating from the center.

A determination reference point is arbitrarily designated by a user.

A determination reference point is set by presenting several candidate points to a user and the user selecting one.

A determination reference point is variably set in an automatic manner by the control unit 30 determining an optimal position according to image content.

A distance Diff(n) as a position state for an candidate image border E(n) is obtained at a time point of each frame.

Figure 7:
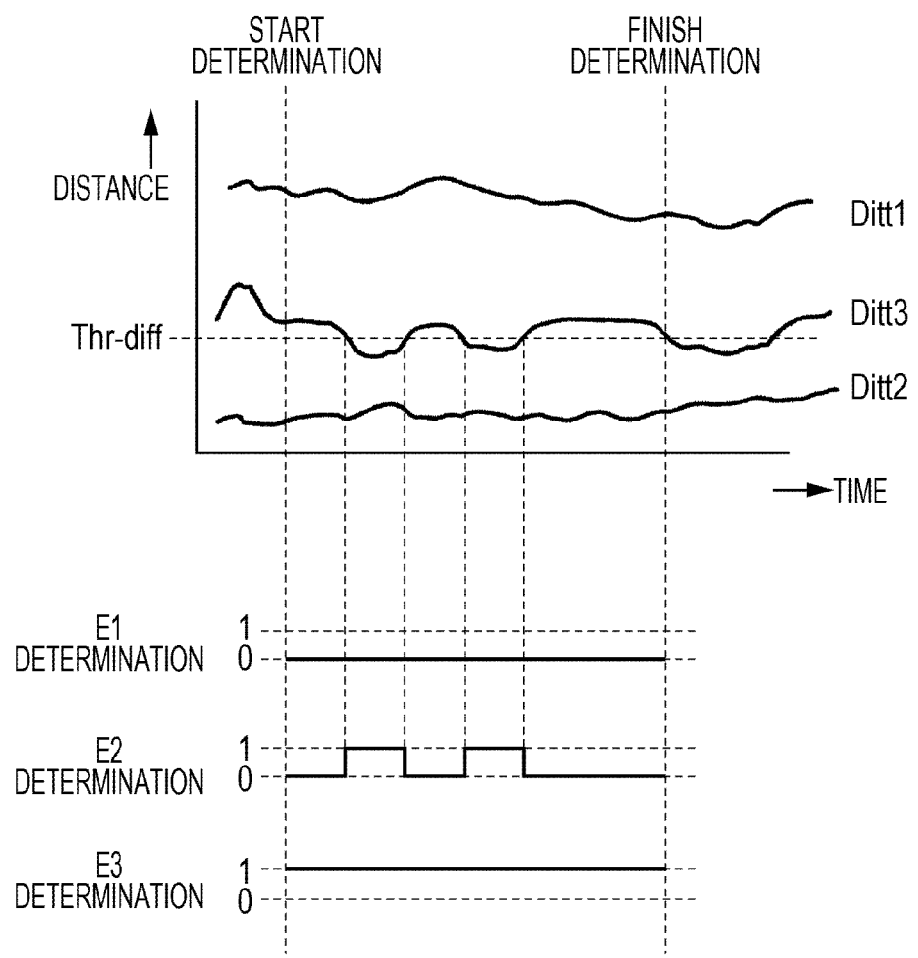
FIG. 7 is a diagram illustrating determination of a degree of stable presence based on a position state according to the embodiment.

FIG. 7 illustrates a state in which the calculated distances Diff1, Diff2 and Diff3 vary assuming that the candidate image borders E1, E2 and E3 are kept present in consecutive frames (FR1, FR2, . . . ) during a certain period. The calculated respective distances Diff1, Diff2 and Diff3 vary on the time axis.

In a processing example of FIG. 8 described later, a degree of stable presence is set to cumulative time of a state close to the determination reference point SP. For this reason, a distance threshold value Trs-diff is used to determine "close/not close".

The lower part of FIG. 7 illustrates a result of determination of whether or not the distances Diff1, Diff2 and Diff3 are equal to or less than the distance threshold value Trs-diff at respective time points. If the distance Diff(n) is equal to or less than the distance threshold value Trs-diff, this is regarded to be close="1". A degree of stable presence in a processing example 1 is obtained by cumulatively adding the determination result "1" at respective time points.

A period from starting of determination to finishing of the determination is different depending on a specific processing example. In the processing example of FIG. 8 described later, a cumulative addition value of the determination result "1" which is equal to or less than the distance threshold value Trs-diff is cumulative time indicating a degree of stable presence up to that time, but the time when a candidate image whose cumulative time reaches a predetermined value is a timing of finishing of the determination.

For example, in the example of FIG. 7, the candidate image border E3 is continuously determined as being "1", but the determination is finished at the time when the cumulative addition value reaches a certain predetermined value, and the candidate image border E3 is determined as being a main subject.

In addition, here, continuity does not matter. For example, the distance Diff2 of the candidate image border E2 in FIG. 7 is determined as being "1" and "0" depending on time points, but the candidate image border E2 may be determined as being a main subject in a case where there are many circumstances of "1" only in terms of cumulative time, and the cumulative time thereof reaches a predetermined value earlier than other candidate image borders.

However, an example may be considered in which the continuity is used in a condition of a degree of stable presence.

Figure 8:
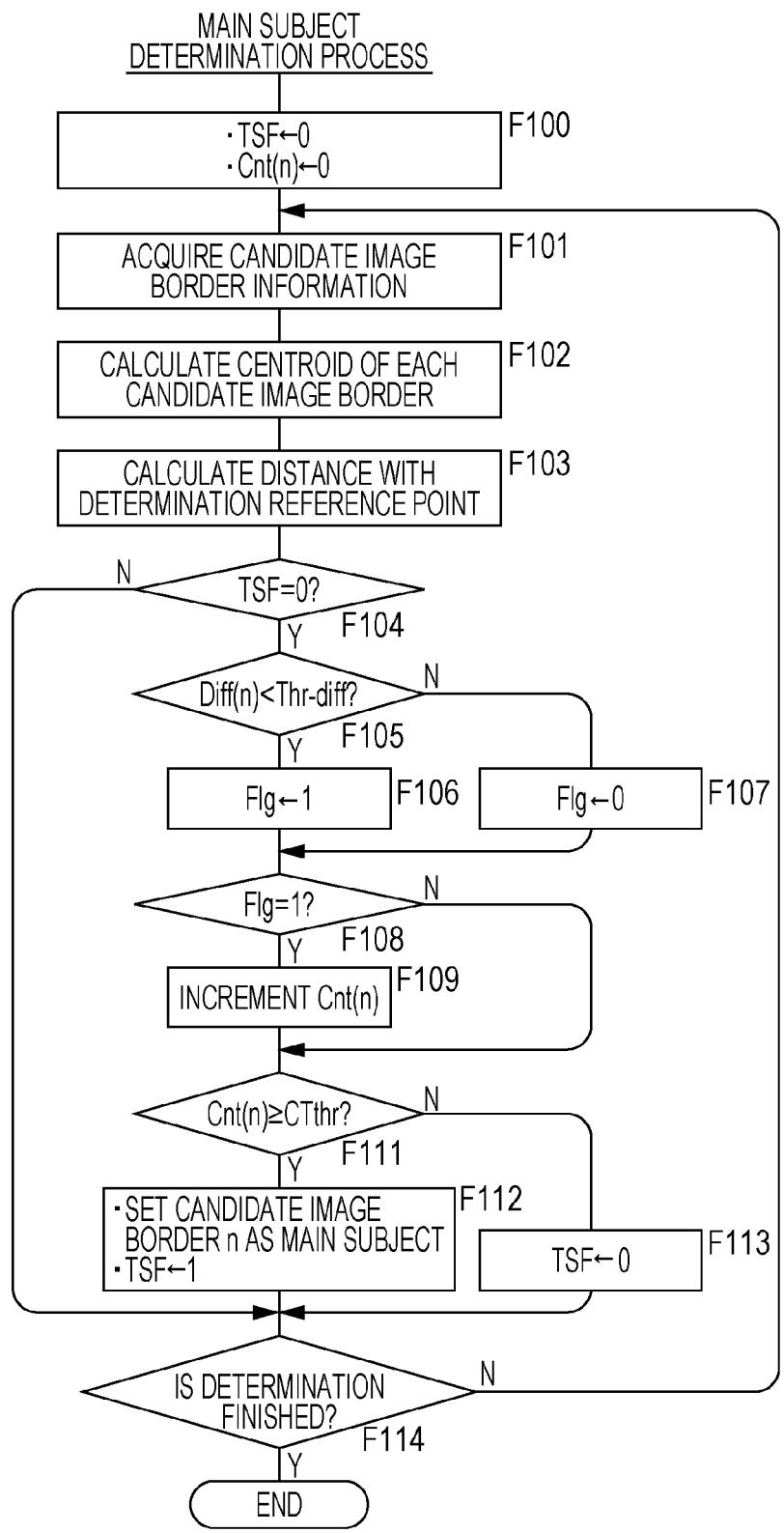
FIG. 8 is a flowchart illustrating a specific main subject determination process according to the embodiment.

With reference to FIG. 8, a specific example of the main subject determination process in the control unit 30 will be described.

First, in step F100, a variable TSF is set to 0, and a count value Cnt(n) is set to 0.

The variable TSF is a flag indicating whether or not main subject setting is completed. TSF="0" indicates that a main subject is not determined. In addition, the count value Cnt(n) is a counter value obtained by adding a value of a determination result of comparison with the above-described distance threshold value Trs-diff of a distance Diff.

In addition, "n" indicates a natural number, and the count value Cnt(n) is set to a count value corresponding to a detected candidate image border E(n). For example, in a case where three candidate image borders E1, E2 and E3 are detected, Cnt1, Cnt2, and Cnt3 are used as count values.

Further, similarly, the distance Diff(n) is assumed to collectively indicate distances Diff1, Diff2 and Diff3 of the three candidate image borders E1, E2 and E3 from the determination reference point SP.

The candidate image border E(n) indicates candidate image borders E1, E2, E3, . . . , but these are preferably differentiated from each other depending on subjects over a plurality of frames. For example, when an example is described in which the candidate detection portion 26 extracts a face, in a case where a person A, a person B, and a person C are subjects, face image parts of the persons A, B and C serve as candidate image borders E1, E2 and E3 in common to respective frames. Even if only a person D is a subject in a certain middle frame, a face image part of the person D serves as a candidate image border E4. Therefore, the candidate detection portion 26 may not only detect a "face", but may also determine an individual.

In step F101, the control unit 30 acquires candidate image border information on a certain frame from the candidate detection portion 26. For example, positional information or size information is acquired in relation to each candidate image border E(n).

In step F102, the control unit 30 calculates coordinates of a centroid G in relation to each candidate image border E(n).

For example, it is assumed that coordinate values of an upper left vertex of a square candidate image border are given. These xy coordinate values are set to (E(n)_x,E(n)_y). In addition, as illustrated in FIG. 6, xy coordinates have an upper left point of a screen plane as the origin O.

Further, a width w of the candidate image border E(n) is set to E(n)_w, and a height h thereof is set to E(n)_h.

Furthermore, when coordinate values of the centroid G of the candidate image border E(n) are set to (E(n)_cx,E(n)_cy), the coordinate values of the centroid G are obtained as follows.

$$E(n)\_cx = E(n)\_x + (E(n)\_w)/2$$

$$E(n)\_cy = E(n)\_y + (E(n)\_h)/2$$

In step F103, the control unit 30 calculates a distance Diff(n) from the centroid G of each candidate image border E(n) to the determination reference point SP. Coordinate values (Cx,Cy) of the determination reference point SP are obtained as follows.

$$\mathrm{Diff}(n) = \sqrt{\{(E(n)\_cx - Cx)^2 + (E(n)\_cy - Cy)^2\}}$$

In step F104, the variable TSF is checked. If the variable TSF is 0, the flow proceeds to step F105.

In addition, as will be described later, in the present embodiment, the main subject determination process is performed on the basis of the stable imaging state estimation process, and thus step F104 may be omitted.

Figure 23:
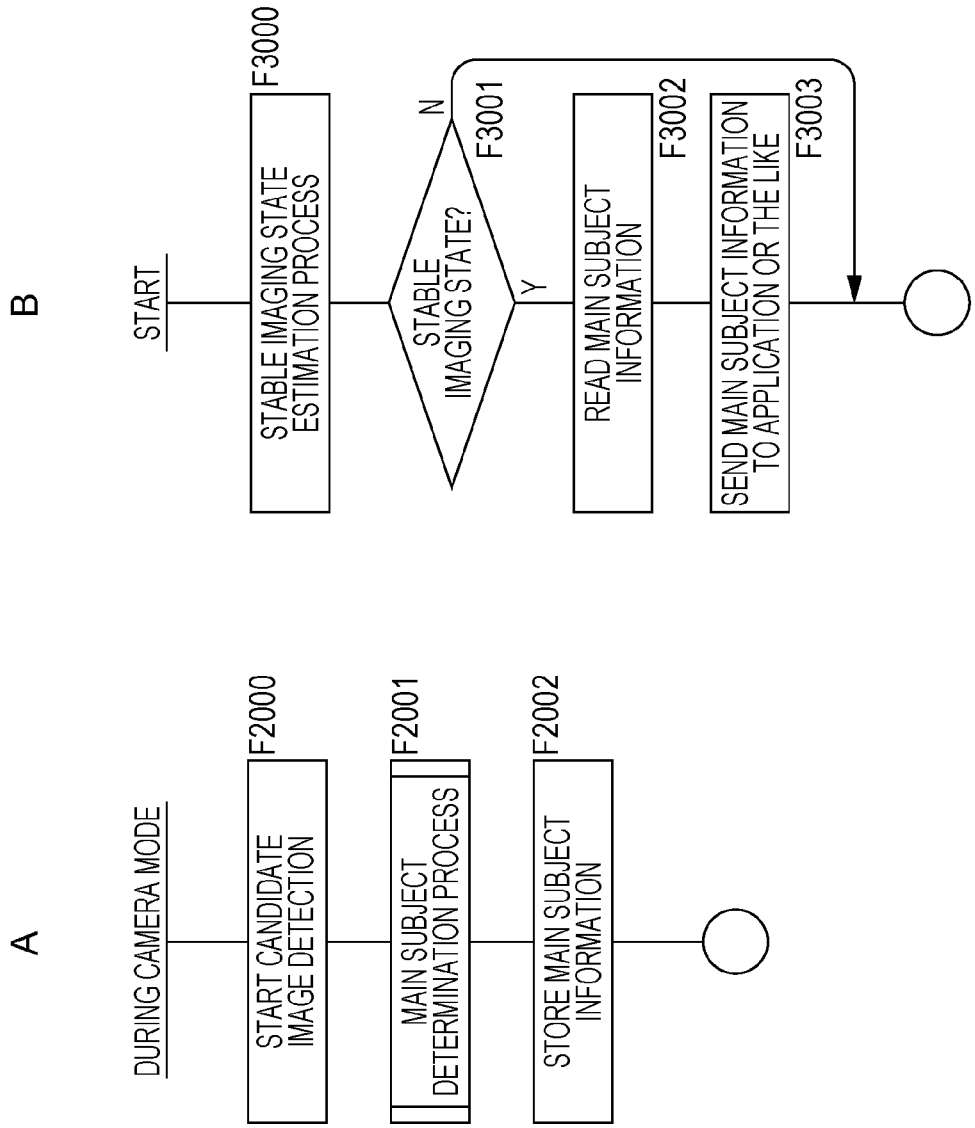
FIG. 23 is a flowchart illustrating another main subject determination process in the image processing device according to the embodiment.

However, although described in FIG. 23, there is also a processing example in which the main subject determination process is performed at all times. In this case, the process in step F104 is skipped.

In steps F105, F106 and F107, it is determined whether or not the distance Diff(n) to the determination reference point SP is close to the determination reference point SP by using the distance threshold value Trs-diff.

The distance Diff(n) of each candidate image border E(n) to the determination reference point SP is compared with the distance threshold value Trs-diff, and if distance Diff(n)<Trs-diff, a flag Flg(n) is set to 1 in step F106. In addition, if not Diff(n)<Trs-diff, the flag Flg(n) is set to 0 in step F107.

Next, in steps F108 and F109, a degree of stable presence of each candidate image border E(n) is calculated. First, it is checked whether or not the flag Flg(n) is 1 in step F108, and if the flag Flg(n)=1, the count value Cnt(n) is incremented in step F109. If the flag Flg(n)=0, the count value Cnt(n) is not changed.

The count value Cnt(n) is a value of the degree of stable presence as a cumulative addition value. In other words, the count value is a value indicating a frequency of a state in which the candidate image border E(n) is "close" to the determination reference point SP.

Next, in steps F111, F112 and F113, a main subject is determined by using the degree of stable presence of each candidate image border E(n).

In step F111, it is checked whether or not the count value Cnt(n) of each candidate image border E(n) reaches a count threshold value CTthr.

If not Cnt(n)≥CTthr, that is, all of the count values Cnt(n) of the respective candidate image borders E(n) do not reach the count threshold value CTthr, the determination is not finished in step F114 in a state in which the variable TSF is 0 in step F113, and the flow returns to step F101. In this case, the processes in step F101 and the subsequent steps are performed as described above on the basis of candidate image border information which is input in relation to the next frame.

In addition, in step F114, if the variable TSF=0, the determination of a main subject is not yet completed, and thus the determination process is kept being performed, and if the variable TSF=1, the main subject determination is completed.

In a case where the variable TSF=1 is detected in step F104 described above, the determination is finished in this state.

Although detailed description is omitted, in parallel to the automatic main subject determination of this example, a main subject may be selected through an operation such as a user performing an operation of touching a main subject on a screen of the display portion 34, or adjusting a subject to a predetermined position on the screen and half-pressing a shutter button. In a case where the user performs such a designation operation during execution of the process of FIG. 8, the user's operation is preferably prioritized. Therefore, when a main subject is set by the manual operation, the variable TSF is set to 1. In this case, the process of FIG. 8 may be finished according to the determination in steps F104 and F114.

Since the main subject determination based on the degree of stable presence is performed in certain duration, the determination is not finished in step F114 as described above unless candidate image border information in a number of frames is processed, and the flow returns to step F101 so that the processes are repeatedly performed.

Here, for example, as illustrated in FIG. 7, a certain candidate image border E3 may not be consecutive, but it is assumed that there is a situation in which the border is located at a position close to the determination reference point SP on a captured image at a high frequency in a plurality of frames. Then, since many opportunities occur in which a count value Cnt3 of the candidate image border E3 is incremented in step F109, the count value progresses faster than count values Cnt1 and Cnt2, and thus initially reaches the count threshold value CTthr.

In this case, the control unit 30 makes the process to proceed from step F111 to step F112.

In step F112, the control unit 30 determines the candidate image border E(n) whose count value Cnt(n) reaches the count threshold value CTthr as a main subject, and performs main subject setting. In addition, the variable TSF is set to 1.

In this case, the determination is finished in step F114. In other words, for example, the candidate image border E3 is set as a main subject, and thus the main subject determination process of FIG. 8 is completed.

In addition, in this processing example the process is repeatedly performed until the variable TSF becomes 1, but, in practice, a predetermined restriction time is preferably provided. In other words, in a case where a main subject cannot be determined even if a predetermined time has elapsed from the process start time of FIG. 8, the process is finished due to absence of a main subject.

According to the above-described processing example of FIG. 8, the user holds the imaging apparatus 10 so that a subject which is mainly desired to be imaged is made to be as close to the determination reference point SP such as an image center as possible, and thus subject is automatically as a main subject.

Particularly, in this processing example, a degree of stable presence is determined in a cumulative time of a state of being close to the determination reference point SP. In a case of a subject in moving circumstances, or a subject such as an animal which moves fast, it may be hard for a photographer to keep capturing a subject which is desired to be a main subject at an image center even for some time, for example, several seconds. In addition, depending on an imaging skill of a photographer, a subject which is quite desired to be taken cannot be maintained at an image center due to intensive camera shaking. Even in these cases, a main subject can be determined relatively rapidly by using cumulative time.

Therefore, this is suitable even for a case of targeting a fast moving subject, or a relatively inexperienced user. In addition, since the main subject determination process is not necessarily performed for a specific time, and the process is finished at the time when a main subject is determined, there is an advantage in that main subject determination is rapidly performed depending on a subject or a skill of a photographer.

In addition, specific processing examples of the main subject determination process may be various. For example, as a degree of stable presence of each candidate image border, information on duration when a condition in which a distance with a determination reference point is within a predetermined threshold value is kept being satisfied, may be calculated. If it is estimated whether or not a subject is stably present on the basis of the duration, in a case where a slow moving subject is targeted, the targeted subject can be easily kept being perceived at an image center or the like, and thus there is a high possibility that a main subject desired by a user may be accurately set. Further, since a subject which is desired to be a main subject can be kept being maintained at a position close to the determination reference point SP depending on a skill of a photographer, there is a high probability that the subject desired by the photographer may be accurately determined as being a main subject. In other words, it is possible to further increase a possibility that a subject desired by a user may be determined as being a main subject depending on experts of imaging functions or subjects.

In addition, a weight may be given to calculation of a degree of stable presence. For example, the more an execution period of the main subject determination process elapses, the more highly valued a subject close to the determination reference point SP is.

Generally, in a case where a photographer aims at a subject and holds a camera, at first, a subject desired to be a main subject is not perceived at a desired position such as an image center, and the photographer gradually adjusts an orientation of the camera. Taking this fact into consideration, at first, a subject which the photographer keeps in mind as a "main subject" is gradually perceived at the image center with the passage of time.

Therefore, during execution of the main subject determination process, highly valuing a subject closer to the determination reference point SP with the passage of time increases a possibility that a main subject matching intention of the photographer may be determined.

In addition, in relation to calculation of a degree of stable presence, other conditions may be added in addition to the condition in which the distance Diff(n) is equal to or less than the distance threshold value Trs-diff.

For example, a condition in which a subject distance is within a predetermined range, a condition in which a size is within a predetermined range, a condition in which a subject is a specific type of image, and the like may be added.

Further, a processing example may be considered in which a specific main subject determination period is set, and a candidate image whose value of a degree of stable presence is the highest during the period is determined as being a main subject.

Furthermore, in the above-described processing example, a positional relationship with the set determination reference point is used as a position state of a candidate image border, but a positional relationship with a determination reference region may be used. For example, a region with a square shape, a circular shape, or the like is set at an image center or the like, and is used as a determination reference region. A positional relationship of each candidate image border E(n) with the determination reference region may include, for example, whether or not a centroid is included in the determination reference region;

whether or not a whole thereof is included in the determination reference region;

whether or not at least a part thereof is included in the determination reference region; and whether or not a distance with an outer edge of the determination reference region is within a predetermined range.

A degree of stable presence may be obtained on the condition of the positional relationship.

In addition, as a degree of stable presence of each candidate image border, a position state, for example, an average value of distances with a determination reference point may be calculated. The average distance is an index indicating that a candidate image border is in a position state close to the determination reference point at a temporally high frequency. For example, the meaning of "a value of the average distance being small" is the same as "the cumulative time being long" described in the above processing example. Further, a candidate image border satisfying a condition in which the average distance is the shortest and is within a predetermined threshold value may be determined as being a main subject.

In the present embodiment, for example, in the same manner as in the above-described example, a main subject is determined, and the purpose or the like of performing main subject determination in the imaging apparatus 10 will be described.

First, an example of using a main subject determination result will be described.

The main subject determination is performed, for example, when a user is aiming at a shutter timing, but the control unit 30 may automatically determine a main subject, and then may perform the following processes.

Tracking Process

A main subject set in each captured frame is tracked. For example, a main subject is clearly shown to a user in a state in which a through image is displayed, so as to be provided for a user to adjust an angle of view, for example, to determine a subject in a state of holding a camera with the hand.

In addition, in order to present a main subject, a border of the main subject may be displayed in a highlight manner in a state in which a through image is displayed on the display portion 34. Further, the highlight display or the like may be performed during a specific period right after determination is performed, and may be performed while a main subject is present in the through image.

Focusing

Automatic focusing control is performed on a main subject. In addition, together with a tracking process, a focus is adjusted so as to track a main subject even if the main subject moves around.

Exposure Adjustment

Automatic exposure adjustment is performed on the basis of luminance of a main subject.

Directivity Adjustment

In a case where sounds are received by a microphone along with capturing of moving images, directivity is adjusted on the basis of an orientation of a main subject in an angle-of-view space.

In addition, the directivity adjustment may be used in various signal processes on a captured image signal.

Image Effect Process

Image processes such as image quality adjustment, noise reduction, and flesh tone adjustment are performed only on a region of a main subject in each captured frame.

Alternatively, image effects, for example, a mosaic process, a blurring process, a filling process, and the like may be performed on regions other than the region of a main subject.

Image Editing Process

An editing process such as framing or cropping may be performed on a captured image or a recorded image.

For example, a process such as cutout or enlargement of a partial region in a frame including a main subject may be performed.

In addition, cutting or the like of an peripheral part of an image may be performed so that a main subject is disposed at a center of the image in captured image data so as to adjust composition.

These are only an example, and there may be other various processes in which an application program or the automatic adjustment function of the imaging apparatus uses a set main subject.

Effects achieved by performing the main subject determination process are as follows. When a photographer is aiming at a subject while holding the imaging apparatus 10, an operation for designating a main subject is inherently difficult. If main subject determination is automatically performed, the problem is solved, and thus it is possible to achieve an effect of reducing a stress of a user.

In addition, in the imaging apparatus 10 which is carried and used by a user, such as a digital still camera or a camera built-into a mobile phone which is normally used by the user, the display portion 34 is small-sized, and thus although the user performs an operation of designating a main subject on a screen, it is hard to accurately perform the operation. As in the present embodiment, automatic determination is performed, and thus wrong designation can be prevented.

Further, since the imaging apparatus 10 can be used in a sense of imaging a main subject if the imaging apparatus is naturally held, it is possible to increase imaging opportunities and corresponding use cases and thus also to provide a camera which is easy to use to a user.

From the above description, the imaging apparatus 10 of the present embodiment which automatically performs main subject determination is very suitable as a small-sized camera.

4. Stable Imaging State Estimation Process

Here, when the above-described main subject determination process is performed is considered.

For example, during a period when the imaging apparatus 10 is powered on and displays a through image on the display portion 34, the main subject determination process may be performed at all times, but even if the main subject determination process is performed in a reckless manner, the process is not necessarily meaningful.

For example, when a user has no intention of imaging, such as just carrying the imaging apparatus 10 in a state of being powered on, performing the main subject determination process or using a result of the main subject determination process is not greatly meaningful.

Specifically, it is appropriate to perform the main subject determination process when the user holds the imaging apparatus 10 and tries to perform imaging from now on.

Therefore, in the imaging apparatus of the present embodiment, the stable imaging state estimation portion 30*b* estimates that a stable imaging state occurs, for example, a state in which a user holds the camera, and when it is estimated that the stable imaging state occurs, the main subject determination portion 30*a* performs the above-described main subject determination process so as to output main subject information which is a determination result thereof.

As mentioned above, since the stable imaging state estimation process is performed, the main subject determination process can be performed at a meaningful time.

In other words, since the stable imaging state estimation process is performed through the main subject determination process, the main subject determination process is performed, for example, at a timing when a main subject determination result is not useless, such as a state in which a photographer of the imaging apparatus 10 holds the camera with the intention of imaging, for example, circumstances or the like of looking for a subject. Particularly, since the above-described main subject determination process has a relatively large processing amount, and the stable imaging state estimation process described later is relatively small in a processing burden, it is possible to achieve an effect in which a processing burden on the control unit 30 is reduced or power consumption is reduced.

In other words, it is possible to realize improvement in convenience for a user, a reduction in a processing burden on the control unit 30, and improvement in timeliness of an automatic main subject determination process.

4-1: Execution Opportunity of Stable Imaging State Estimation Process

As mentioned above, the stable imaging state estimation process is a process for determining an execution opportunity of the main subject determination process. First, here, an execution opportunity of the stable imaging state estimation process will be described with reference to FIGS. 9 and 10.

Figure 9:
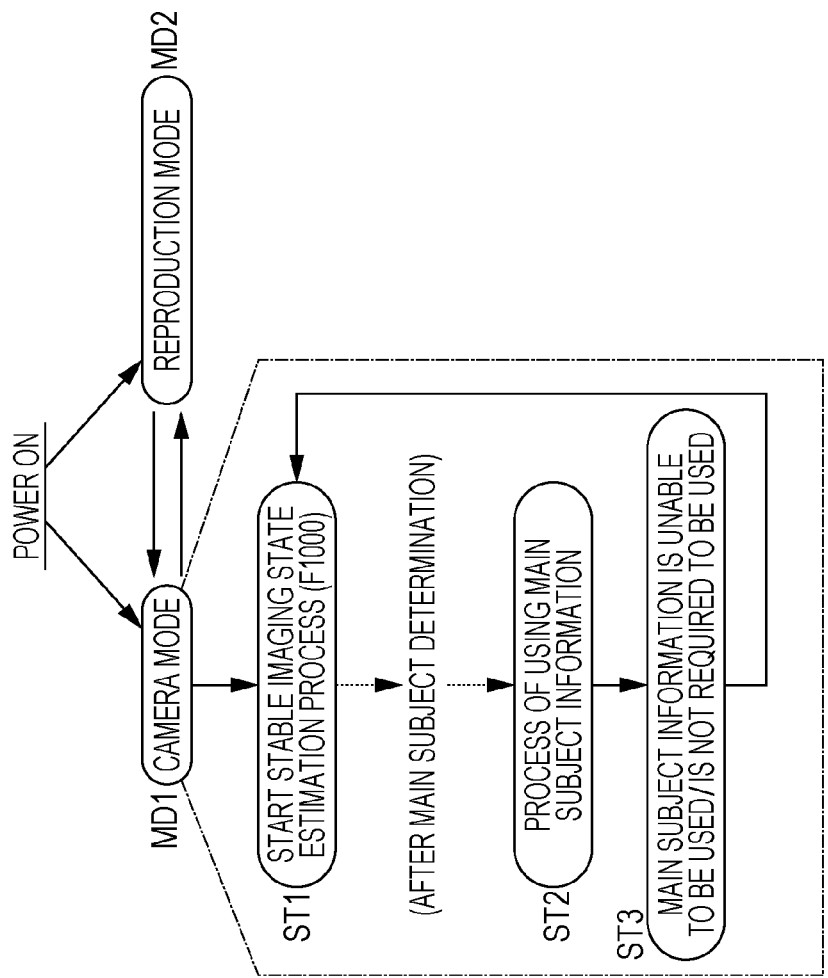
FIG. 9 is a diagram illustrating execution timing of a stable imaging state estimation process according to the embodiment.

FIG. 9 illustrates a camera mode MD1 and a reproduction mode MD2 as modes of the imaging apparatus 10.

The camera mode MD1 is a mode for mainly recording still images or moving images by performing imaging. The reproduction mode MD2 is a mode for mainly reproducing and displaying, on the display portion 34, still image data or moving image data which has already been captured and recorded in, for example, the recording unit 15.

When the imaging apparatus 10 is powered on, the imaging apparatus is activated in either the camera mode MD1 or the reproduction mode MD2. In addition, a user may arbitrarily switch the camera mode MD1 and the reproduction mode MD2 to each other according to the purpose of use of the imaging apparatus 10 at the corresponding time.

In the example of FIG. 9, a stable imaging state estimation process ST1 (step F1000 of FIG. 2A) is started when the camera mode MD1 is started.

A specific example of the stable imaging state estimation process will be described later, but, as can be seen from FIG. 2A, if it is estimated that a stable imaging state occurs as a result of the stable imaging state estimation process, the main subject determination process is performed (F1001 to F1004), and main subject information which is a determination result is used.

First, after main subject determination is performed, a process of using main subject information which is a determination result is performed. In FIG. 9, this process is illustrated as a main subject information using process ST2.

For example, the processes as described in the above-described example of using the main subject information are performed.

Thereafter, there is a case where the main subject information is unable to be used or is not required to be used.

For example, the tracking process, the focusing, the exposure adjustment, the directivity adjustment, the image effect process, the image editing process, and the like, described in the above-described example of using the main subject information, can be performed in a case where a main subject is present in a captured image, but such main subject information using processes cannot be performed in a case where the main subject is framed out and thus is not present in the captured image.

In addition, in a case where a user performs an operation of changing a main subject or an operation for re-determination, or finishes the main subject information using process, the main subject information using process using current main subject information is not necessary.

In circumstances in which the main subject information using process using the current main subject information is not necessary or cannot be performed (ST3), the stable imaging state estimation process ST1 may be performed again.

In addition, this operation transition is an operation transition in the camera mode MD1 as surrounded with dot chain lines. In a case where a mode is switched from the camera mode MD1 to the reproduction mode MD2, the stable imaging state estimation process and the main subject determination process are not performed.

In other words, the example of FIG. 9 is an example in which the stable imaging state estimation portion 30*b* performs the stable imaging state estimation process in response to being brought into a state of the camera mode MD1 which is expected when the main subject determination process effectively functions.

Further, the example is an example in which the stable imaging state estimation portion 30*b* performs the stable imaging state estimation process during the camera mode MD1 even after a result of the main subject determination process is unable to be used or is not required to be used.

Next, an example of FIG. 10A is an example in which a user is allowed to select a mode for determining a main subject in the camera mode MD1.

For example, a main subject determination mode MD11 is selected through a menu operation or the like as a lower mode of the camera mode MD1. FIG. 10B illustrates a display example in which a user is allowed to select the main subject determination mode on the display portion 34.

For example, when the user performs an operation of turning on the main subject determination mode through a selection operation on the screen, the control unit 30 turns on the main subject determination mode MD11.

When the main subject determination mode MD11 is started, the control unit 30 starts the stable imaging state estimation process ST1.

Then, as described in FIG. 2A, if it is estimated that a stable imaging state occurs, the main subject determination process is performed, and main subject information which is a determination result is used.

First, the main subject determination is performed, and then the main subject information using process ST2 is performed which is a process of using the main subject information which is a determination result. For example, the processes as described in the above-described example of using the main subject information are performed. Thereafter, the main subject information is unable to be used or is not required to be used. In the same manner as in the above-described example, in circumstances in which the main subject information using process using the current main subject information is not necessary or is unable to be performed, the stable imaging state estimation process ST1 is performed again.

In addition, this operation transition is an operation transition during a period when the main subject determination mode MD11 is turned on as surrounded with dot chain lines.

In a case where a mode is the camera mode MD1 but the main subject determination mode MD11 is turned off, or is switched to the reproduction mode MD2, the stable imaging state estimation process and the main subject determination process are not performed.

Figure 10:
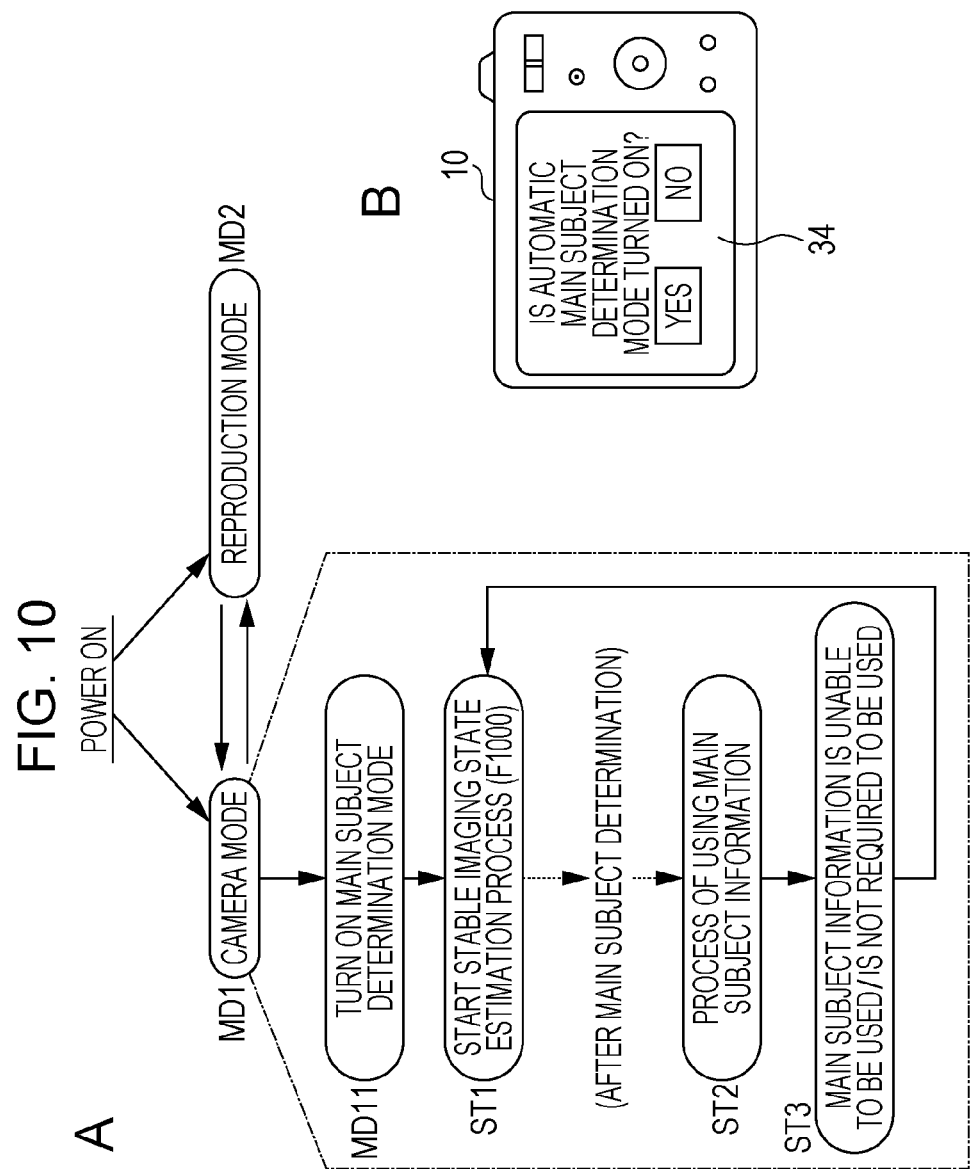
FIG. 10 is a diagram illustrating execution timing of a stable imaging state estimation process according to the embodiment.

In other words, the example of FIG. 10 is an example in which the stable imaging state estimation portion 30b performs the stable imaging state estimation process in response to being brought into a state of the main subject determination mode MD11 which is expected when the main subject determination process effectively functions, and, particularly, the user also requests main subject determination.

Further, the example is an example in which the stable imaging state estimation portion 30b performs the stable imaging state estimation process as long as the main subject determination mode MD11 is turned on even after a result of the main subject determination process is unable to be used or is not required to be used.

For example, in the same manner as in the examples of FIGS. 9 and 10, the stable imaging state estimation process ST1 is performed during the camera mode MD1 or during the main subject determination mode MD11 in the camera mode MD1.

In addition, the main subject determination process is performed on the basis of an estimation result of the stable imaging state estimation process ST1.

4-2: Processing Example 1

Hereinafter, various specific examples of the stable imaging state estimation process will be described.

Figure 11:
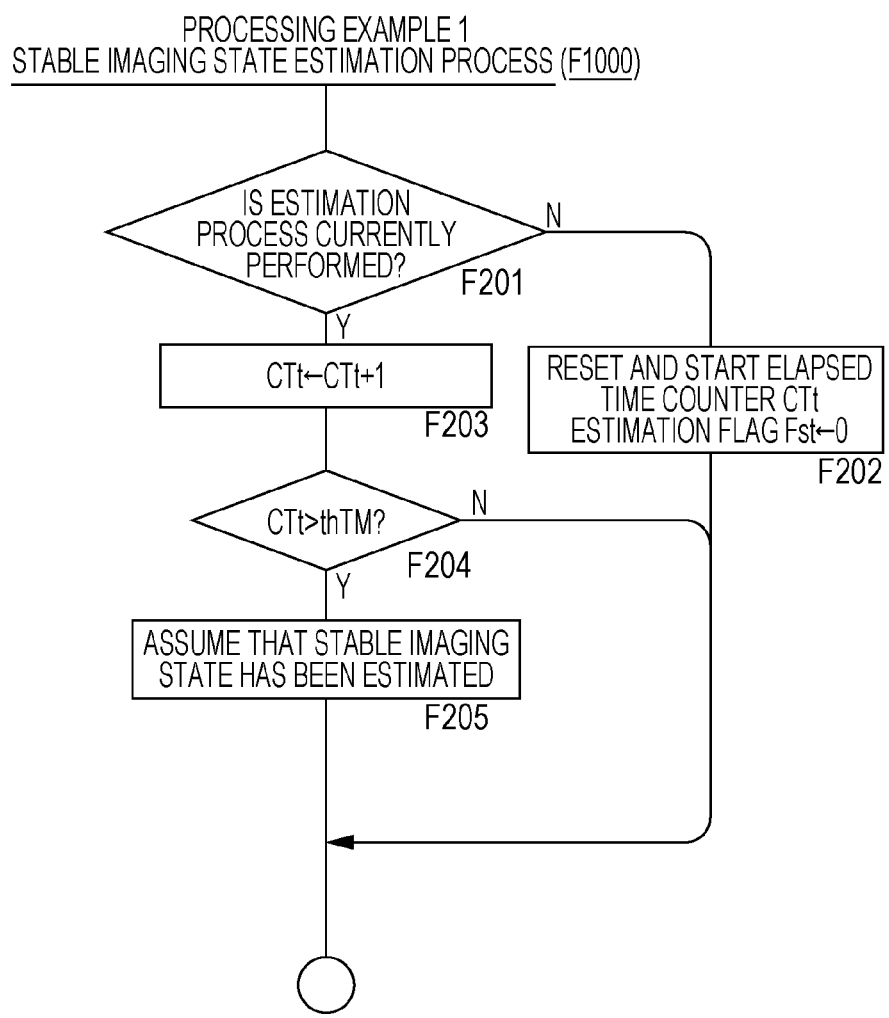
FIG. 11 is a flowchart illustrating a processing example 1 according to the embodiment.

FIG. 11 illustrates a process performed by the stable imaging state estimation portion 30b in the processing example 1 of the stable imaging state estimation process.

The process of FIG. 11 is performed when the camera mode MD1 is turned on in FIG. 9 or when the main subject determination mode MD11 is turned on in FIG. 10. In addition, this fact will not be repeated but is the same for processing examples 2 to 5 described later.

In step F201, the control unit 30 branches the process depending on whether or not the stable imaging state estimation process is currently performed.

At the time when the stable imaging state estimation process is started, the stable imaging state estimation process is not performed yet, and thus the control unit 30 performs a process in step F202.

First, an elapsed time counter CTt is reset so as to start counting. In addition, an estimation flag Fst indicating whether or not a stable imaging state has been estimated to occur is initialized to Fst=0.

The control unit 30 repeatedly performs the process of FIG. 2A, and step F1001 of FIG. 2A is a step for determining whether or not the estimation flag Fst is 1. During a period of the estimation flag Fst=0, as the process of FIG. 2A, step F1000, that is, the process of FIG. 11 is repeatedly performed.

After the stable imaging state estimation process is started, the process of FIG. 11 proceeds from step F201 to step F203.

In step F203, the control unit 30 increments the elapsed time counter CTt.

In addition, in step F204, the control unit 30 compares a value of the elapsed time counter CTt with a predetermined time thTM for estimation.

If the value of the elapsed time counter CTt does not exceed the predetermined time thTM, the process is finished as it is. In other words, the estimation flag Fst=0 is maintained.

With the passage of time, CTt>thTM is determined at a certain time in step F204. In this case, the control unit 30 proceeds to step F205, and sets the estimation flag Fst=1 assuming that a stable imaging state has been estimated to occur.

In the estimation flag Fst=1 as mentioned above, the control unit 30 starts the main subject determination process in step F1001 of FIG. 2A and proceeds to steps F1002 to F1004.

In the above-described stable imaging state estimation process of FIG. 11, it is estimated that a stable imaging state occurs on the condition that the predetermined time thTM has elapsed from the time of a transition to a predetermined mode state in which the main subject determination process effectively functions, that is, the camera mode MD1 in FIG. 9 or the main subject determination mode MD11 in FIG. 10.

Typically, a user performs an operation of turning on power or the camera mode MD1, and then assumes a posture of holding the imaging apparatus 10 for imaging. Also after the main subject determination mode MD11 is turned on, an imaging posture may be assumed.

Therefore, if a transition to such a mode is performed, it can be estimated that the user holds the imaging apparatus 10 for imaging at the time when a predetermined time has elapsed therefrom. Therefore, in the processing example 1, in the stable imaging state estimation process, most simply, a coefficient process of the predetermined time thTM is performed.

As mentioned above, since the stable imaging state estimation process is performed, and the main subject determination process is performed on the basis thereof, a user is not required to be aware of starting of the main subject determination process, and the main subject determination process is started at an appropriate timing without imposing an operation burden. In addition, a processing burden on the control unit 30 for the stable imaging state estimation process is very small.

4-3: Processing Example 2

The processing example 2 will be described with reference to FIGS. 12 and 13. The processing example 2 is an example of performing estimation of a stable imaging state on the basis of a detection result of an imaging field-of-view variation. Here, the example is an example in which an output of a sensor which detects a motion of the imaging apparatus 10 is especially used to detect an imaging field-of-view variation.

The sensor is, for example, a gyro sensor which detects shaking applied to the imaging apparatus 10, such as camera shaking when a user carries the imaging apparatus 10, or an acceleration sensor which detects a posture.

For example, the sensor unit 14 of FIG. 3 includes the gyro sensor or the acceleration sensor, and the control unit 30 can detect an output from the sensor.

FIG. 12A illustrates a process performed by the stable imaging state estimation portion 30b, as the processing example 2 of the stable imaging state estimation process.

In step F300, the control unit 30 branches the process depending on whether or not the stable imaging state estimation process is currently performed.

At the time when the stable imaging state estimation process is started, the stable imaging state estimation process is not performed yet, and thus the control unit 30 resets a counter CTst (hereinafter, referred to as a stable time measuring counter CTst) for measuring a stable time to CTst=0 in step F307. In addition, an estimation flag Fst indicating whether or not a stable imaging state has been estimated to occur is initialized to Fst=0.

In the same manner as in the previous processing example 1, during a period of the estimation flag Fst=0, as the process of FIG. 2A, step F1000, that is, the process of FIG. 12A is repeatedly performed.

After the stable imaging state estimation process is started, the process of FIG. 12A proceeds from step F300 to step F301.

In step F301, the control unit 30 acquires a sensor input from the sensor unit 14. For example, a detection value of the gyro sensor or the acceleration sensor is acquired.

For example, if a detection value of the gyro sensor is acquired in step F301, the control unit 30 determines whether or not the detection value is within a predetermined level range in step F302. Although described in FIG. 13, the predetermined level range is a level range in which it can be estimated that, for example, a camera shaking level is small, and the imaging apparatus 10 is stable.

If it is determined that the detection value of the sensor is within the predetermined level range, the control unit 30 proceeds to step F303, and increments the stable time measuring counter CTst.

On the other hand, if it is determined that the detection value of the sensor is not within the predetermined level range, the control unit 30 proceeds to step F304, and decrements the stable time measuring counter CTst.

In step F305, the control unit 30 compares a count value of the counter CTst with a predetermined time thTM for estimation.

If the value of the elapsed time counter CTt does not exceed the predetermined time thTM, the process is finished as it is. In other words, the estimation flag Fst=0 is maintained.

If CTst>thTM is determined in step F305, the control unit 30 proceeds to step F306, and sets the estimation flag Fst=1 assuming that a stable imaging state has been estimated to occur.

In the estimation flag Fst=1 as mentioned above, the control unit 30 starts the main subject determination process in step F1001 of FIG. 2A and proceeds to steps F1002 to F1004.

An operation example based on this process will be described with reference to FIG. 13.

FIG. 13A illustrates a case where the control unit 30 uses a detection output of the gyro sensor. A longitudinal axis expresses a detection value of the gyro sensor, and a transverse axis expresses the time. Each dot of a waveform indicated with dotted lines indicates a detection value input to the control unit 30 at each time point in step F301.

The predetermined level range which is used for the determination in step F302 is assumed to be a range between levels L1 and L2 of the detection value.

In addition, a value of the estimation flag Fst is also illustrated.

Further, it is assumed that the stable imaging state estimation process is started at the time point t0.

A detection value of the gyro sensor has a higher level, for example, as shaking applied to the imaging apparatus 10 due to camera shaking of a user is larger.

Therefore, if the detection value is within the predetermined level range, circumstances in which camera shaking or the like is small, that is, circumstances in which a photographer tightly holds the imaging apparatus 10 to some extent can be estimated.

This example shows circumstances in which shaking is relatively large up to the time point t1. For example, circumstances are expected in which a user does not yet tightly hold the imaging apparatus 10, for example, the user just carries the imaging apparatus or is roughly looking for a subject.

In the process of FIG. 12A, if the detection value of the sensor is within the predetermined level range, the stable time measuring counter CTst is incremented, and if the detection value is out of the predetermined level range, the stable time measuring counter is decremented.

For this reason, for example, if shaking applied to the imaging apparatus 10 is reduced after the time point t1, a value of the stable time measuring counter CTst exceeds a value of the predetermined time thTM at a certain time. For example, it is assumed that CTst>thTM occurs at the time point t2.

If this is determined in step F305 described above, the estimation flag Fst is set to 1 in step F306. As in FIG. 13A, the estimation flag Fst is set to 1 at the time point t2.

As mentioned above, an imaging field-of-view variation is detected by detecting shaking applied to the imaging apparatus 10. If a time period during which shaking applied to the imaging apparatus 10 is small lasts to some extent, it can be determined that the imaging field-of-view variation is small, and an imaging field of view is stable. In this case, it is estimated that a stable imaging state occurs.

Next, FIG. 13B illustrates a case where the control unit 30 uses a detection output of the acceleration sensor. A longitudinal axis expresses a detection value of the angular velocity sensor, and a transverse axis expresses the time. Each dot of a waveform indicated with dotted lines indicates a detection value input to the control unit 30 at each time point in step F301.

The predetermined level range which is used for the determination in step F302 is assumed to be a range between levels L1 and L2 of the detection value. In addition, a value of the estimation flag Fst is also illustrated. Further, it is assumed that the stable imaging state estimation process is started at the time point t0.

A detection value of the acceleration sensor varies depending on a posture variation of the imaging apparatus 10. The greater a motion of the imaging apparatus 10 is, the greater a variation in a resistance value is. A detection value greatly varies, for example, when a user just carries the imaging apparatus 10 or is roughly looking for a subject while holding the imaging apparatus 10.

Therefore, if a time period during which the detection value is within the predetermined level range lasts to some extent, circumstances in which a photographer narrows down a subject orientation to some extent and tightly holds the imaging apparatus 10 can be estimated.

This example shows circumstances in which there are relatively many motions up to the time point t1.

On the other hand, if the user narrows down a subject orientation to some extent, and holds the imaging apparatus 10, a motion of the imaging apparatus 10 is reduced, and a posture thereof is stabilized. For example, circumstances in which a posture of the imaging apparatus 10 is stable occurs from the time point t1.

In the process of FIG. 12A, if the detection value of the sensor is within the predetermined level range, the stable time measuring counter CTst is incremented, and if the detection value is out of the predetermined level range, the stable time measuring counter is decremented.

For this reason, for example, if a posture of the imaging apparatus 10 is kept stable after the time point t1, a value of the stable time measuring counter CTst exceeds a value of the predetermined time thTM at a certain time. For example, it is assumed that CTst>thTM occurs at the time point t2.

If this is determined in step F305 described above, the estimation flag Fst is set to 1 in step F306. As in FIG. 13B, the estimation flag Fst is set to 1 at the time point t2.

As mentioned above, an imaging field-of-view variation is detected by detecting a motion of the imaging apparatus 10. If a state in which a posture of the imaging apparatus 10 is defined lasts to some extent, it can be determined that the imaging field-of-view variation is very few, and an imaging field of view is stable. In this case, it is estimated that a stable imaging state occurs.

Particularly, accuracy of estimation on the occurrence of the stable imaging state increases by determining shaking or a posture of the imaging apparatus 10.

In addition, in the processing example 2 of FIG. 12A, for example, either one of detection values of the gyro sensor and the acceleration sensor may be used, and both of the sensors may be used.

For example, the process of FIG. 12A targeting a detection value of the gyro sensor and the process of FIG. 12A targeting a detection value of the acceleration sensor may be performed in parallel, and a stable imaging state may be estimated to occur when the estimation flag Fst is set to 1 in either one (OR condition).

Alternatively, the determination of a detection value being within the predetermined level range in step F302 may be determination of whether or not both a detection value of the gyro sensor and a detection value of the acceleration sensor are within the predetermined level range (AND condition).

In addition, detection values of other sensors such as an azimuth sensor and a geomagnetic sensor may be used separately or in combination. In any case, circumstances in which a motion or a posture variation of the imaging apparatus 10 is rather small may be estimated as a stable imaging state. In a case where a plurality of sensors are used in combination, it may be natural that the above-described OR condition or AND condition be employed.

In addition, there may be other processes of the stable time measuring counter CTst.

As indicated with dashed lines in FIG. 12A, if it is determined that a detection value is not within the predetermined level range in step F302, the stable time measuring counter CTst may not be decremented, and the flow may proceed to step F305 without change. In other words, this is an example in which a count value is not changed.

Accordingly, even if there is some shaking, motion, or the like, generally, a state in which shaking is small and a posture is stable can be easily estimated as a stable imaging state. This may easily start the main subject determination process when an inexperienced user or the like with much camera shaking is expected.

In addition, the process in step F304 may be replaced with step F304A illustrated in FIG. 12B.

In other words, this is an example in which, if it is determined that a detection value is not within the predetermined level range in step F302, a value of the stable time measuring counter CTst is reset to 0. Accordingly, a state in which no shaking or motion is kept lasts for the predetermined time thTM, and is thus finally estimated as a stable imaging state; therefore, it is possible to increase accuracy of estimation. This may be preferable since the main subject determination process is not started in a reckless manner for a user who is used to imaging.

Conversely, the decrement as in step F304 of FIG. 12A is suitable for a case where many users are generally targeted since the stable time measuring counter CTst is not reset even if there is instantaneous shaking or posture variation, and thus a state which is relatively stable can be detected.

4-4: Processing Example 3

Figure 14:
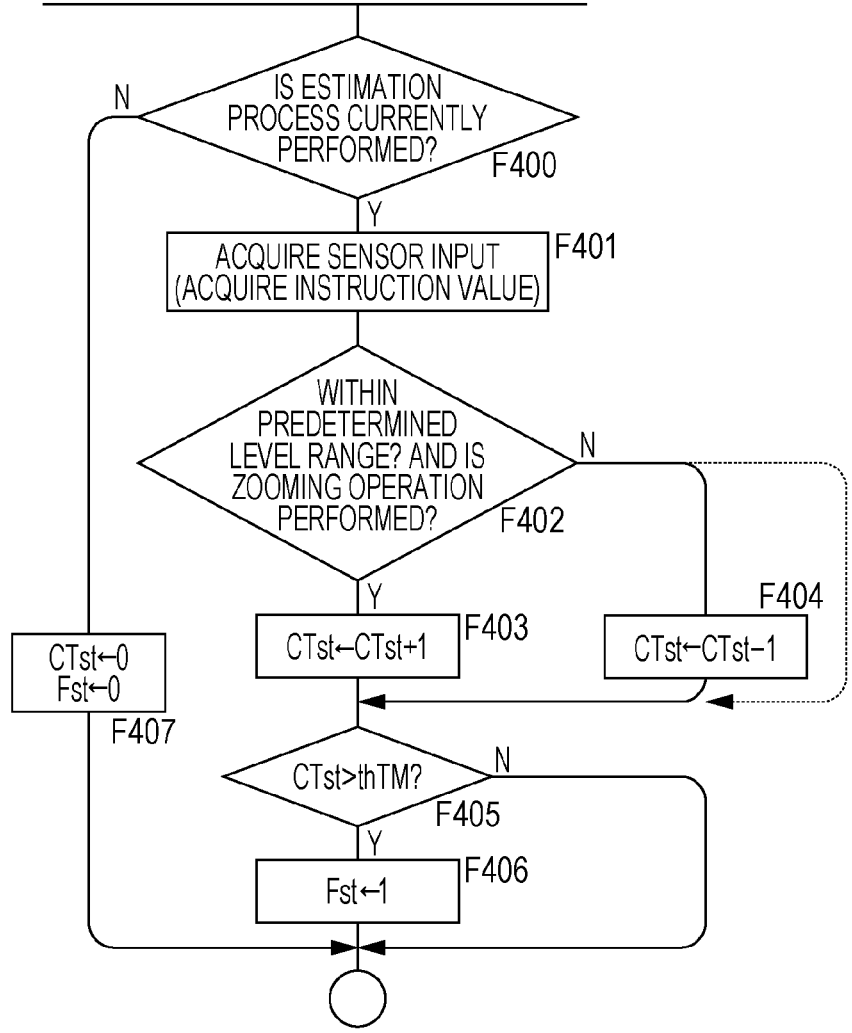
FIG. 14 is a flowchart illustrating a processing example 3 according to the embodiment.

The processing example 3 will be described with reference to FIGS. 14 and 15. The processing example 3 is also an example in which it is estimated that a stable imaging state occurs on the basis of a detection result of an imaging field-of-view variation. Here, the example is an example in which a detection result of camera work causing an imaging field-of-view variation is especially used for estimation of a stable imaging state.

The camera work causing an imaging field-of-view variation described here is panning, tilting, zooming, and the like, and further includes operations based on such automatic operations or a user's operation.

The camera work is detected as follows.

The panning which is a movement of the imaging field of view in a horizontal direction can be detected by, for example, a gyro sensor, or an acceleration sensor in the horizontal direction. These sensors may be provided in the sensor unit 14. In addition, in a case where the imaging apparatus 10 is mounted on a platform, and the panning is performed by a panning motor operation of the platform, a control signal applied to a panning mechanism thereof may be used. Further, if a panning position detection sensor of the platform or the like is provided, a detection value thereof may be used. In this manner, the control unit 30 can detect execution/non-execution of the panning or a movement amount of the panning.

Furthermore, the digital signal processing unit 20, for example, the motion vector detection portion 27 or the control unit 30 performs image data analysis so as to detect a motion in a panning direction, thereby detecting execution/non-execution of the panning, or a movement amount of the panning.

The tilting which is a movement of the imaging field of view in a vertical direction can be detected by, for example, a gyro sensor, or an acceleration sensor in the vertical direction. These sensors may be provided in the sensor unit 14. In addition, in a case where the imaging apparatus 10 is mounted on a platform, and the tilting is performed by a tilting motor operation of the platform, a control signal applied to a tilting mechanism thereof may be used. Further, if a tilting position detection sensor of the platform or the like is provided, a detection value thereof may be used. In this manner, the control unit 30 can detect execution/non-execution of the tilting or a movement amount of the tilting.

Furthermore, the digital signal processing unit 20, for example, the motion vector detection portion 27 or the control unit 30 performs image data analysis so as to detect a motion of a captured image in a tilting direction, thereby detecting execution/non-execution of the tilting, or a movement amount of the tilting.

In relation to the zooming, in a case where the zooming is performed by a user's zooming operation or automatic control, the control unit 30 itself can detect a zooming operation on the basis of a zooming control signal which is sent to the optical system driving unit 13 by the control unit 30.

In addition, if a zoom lens position sensor is provided in the sensor unit 14, the control unit 30 can detect a motion of the zoom lens from a detection value thereof, that is, a zooming operation.

In this manner, the control unit 30 can detect execution/non-execution of the zooming or a movement amount of the zooming.

In addition, the digital signal processing unit 20 or the control unit 30 may perform image data analysis so as to detect a variation in a subject region or a variation in an angle of view, thereby detecting a zooming operation.

FIG. 14A illustrates a process performed by the stable imaging state estimation portion 30b in the processing example 3 of the stable imaging state estimation process.

In step F400, the control unit 30 branches the process depending on whether or not the stable imaging state estimation process is currently performed.

At the time when the stable imaging state estimation process is started, the stable imaging state estimation process is not performed yet, and thus the control unit 30 resets the stable time measuring counter CTst to 0 in step F407. In addition, an estimation flag Fst indicating whether or not a stable imaging state has been estimated to occur is initialized to Fst=0.

In the same manner as in the previous processing examples 1 and 2, during a period of the estimation flag Fst=0, as the process of FIG. 2A, step F1000, that is, the process of FIG. 14A is repeatedly performed.

After the stable imaging state estimation process is started, the process of FIG. 14A proceeds from step F400 to step F401.

In step F401, the control unit 30 acquires a sensor input from the sensor unit 14, for example, a detection value of the gyro sensor, an instruction value of a zooming operation issued to the optical system driving unit 13 by the control unit, or the like. In other words, each operation state of panning, tilting, and zooming is detected.

Next, in step F402, the control unit 30 determines whether or not a detection value of a motion due to a panning or tilting operation is within a predetermined level range, and determines whether or not a zooming operation is performed. The predetermined level range in which the detection value of a motion due to a panning or tilting operation is included is a level range indicating that the panning or the tilting is not performed, or indicating circumstances in which a minute movement is performed even if the panning or the tilting is performed.

If it is determined that the detection value of the sensor for the panning or tilting operation is within the predetermined level range, and the zooming operation is not performed, the control unit 30 proceeds to step F403, and increments the stable time measuring counter CTst.

On the other hand, it is determined that the detection value of the sensor is not within the predetermined level range and the panning or tilting operation is performed, or the zooming operation is performed, the control unit 30 proceeds to step F404, and decrements the stable time measuring counter CTst.

In step F405, the control unit 30 compares a count value of the counter CTst with a predetermined time thTM for estimation.

If the value of the elapsed time counter CTt does not exceed the predetermined time thTM, the process is finished as it is. In other words, the estimation flag Fst=0 is maintained.

In addition, if CTst>thTM is determined in step F405, the control unit 30 proceeds to step F406, and sets the estimation flag Fst=1 assuming that a stable imaging state has been estimated to occur.

In the estimation flag Fst=1 as mentioned above, the control unit 30 starts the main subject determination process in step F1001 of FIG. 2A and proceeds to steps F1002 to F1004.

An operation example based on this process will be described with reference to FIG. 15.

Figure 15:
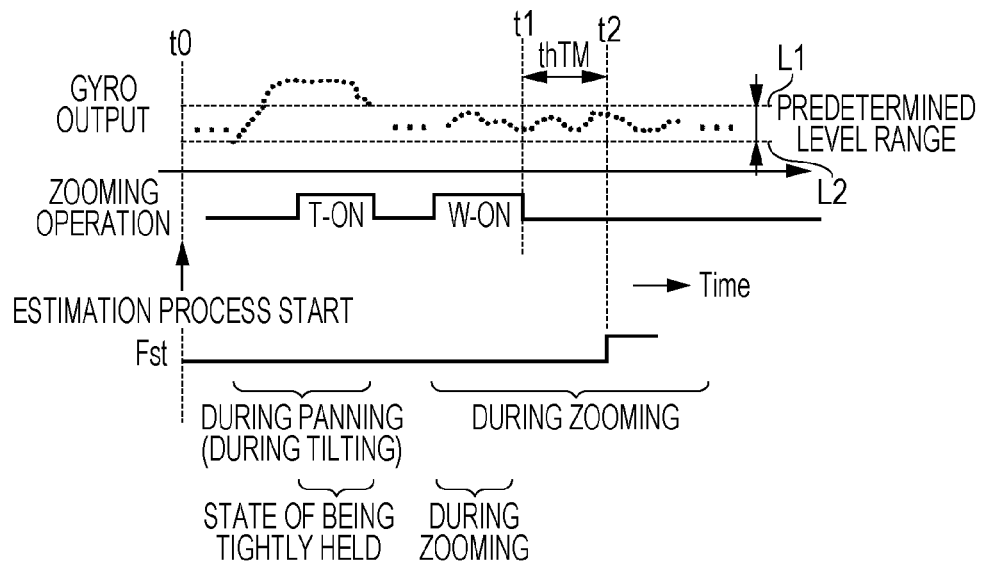
FIG. 15 is a diagram illustrating an operation in the processing example 3 according to the embodiment.

FIG. 15 illustrates a case where the control unit 30 detects a panning or tilting operation with the gyro sensor and detects a zooming operation on the basis of an instruction value of the zooming operation. A longitudinal axis expresses a detection value of the gyro sensor and a zooming instruction value output, and a transverse axis expresses the time. In relation to the gyro sensor output, each dot of a waveform indicated with dotted lines indicates a detection value input to the control unit 30 at each time point in step F401. The predetermined level range which is used for the determination in step F402 is assumed to be a range between levels L1 and L2 of a detection value.

As instruction values which are output to the optical system driving unit 13 by the control unit 30 in order to perform a zooming operation, T-ON indicates that an instruction value for an operation toward a telescopic side is output, and W-ON indicates that an instruction value for an operation toward a wide angle side is output. The control unit 30 can check whether or not a zooming operation is performed on the basis of an instruction value output thereof.

In addition, a value of the estimation flag Fst is also illustrated.

Further, it is assumed that the stable imaging state estimation process is started at the time point t0.

A detection value of the gyro sensor has a high level while panning or tilting is performed.

Therefore, if the detection value is within the predetermined level range, circumstances can be determined in which the panning or the tilting is not performed, or minute panning or tilting is performed.

In this example, it is detected that panning or tilting has been performed, or zooming has been performed up to the time point t1. Therefore, up to the time point t1, circumstances are expected in which a user roughly moves the imaging apparatus 10 so as to look for a subject or to look for an angle of view.

When the user does not perform a panning, tilting or zooming operation, it may be considered that circumstances occur in which the user narrows down an imaging field of view to some extent and tightly holds the imaging apparatus 10 so as to wait for shutter timing.

For example, a large panning, tilting or zooming operation is not performed from the time point t1.

In the process of FIG. 14A, since the stable time measuring counter CTst is incremented in these circumstances, and if these circumstances last, a value of the stable time measuring counter CTst exceeds a value of the predetermined time thTM at a certain time. For example, CTst>thTM occurs at the time point t2.

If this is determined in step F405 described above, the estimation flag Fst is set to 1 in step F406. As in FIG. 15A, the estimation flag Fst is set to 1 at the time point t2.

As mentioned above, if a period in which a panning, tilting or zooming operation is not performed lasts to some extent, that is, a period in which an imaging field-of-view variation of a captured image is small lasts to some extent, it can be determined that an imaging field of view is stable. In this case, it is estimated that a stable imaging state occurs.

If a field-of-view variation of the imaging apparatus 10 due to a panning, tilting or zooming operation is small, it can be estimated with high accuracy that a photographer roughly determines a subject orientation or an angle of view so as to try to perform imaging. Therefore, the main subject determination is started in step F1001 of FIG. 2A on the basis of the stable imaging state estimation result, and thus the main subject determination process is performed at an appropriate timing.

In addition, in the processing example 3 of FIG. 14A, although the flow proceeds to step F403 in an AND condition of a panning or a tilting operation and a zooming operation in step F402, and the stable time measuring counter CTst is incremented, either one of a panning or tilting operation and a zooming operation may be a detection target, and the flow may proceed to step F403 in an OR condition with both of the operations as detection targets.

In addition, there may be other processes of the stable time measuring counter CTst.

As indicated with dashed lines in FIG. 14A, if it is determined that the condition in step F402 is not satisfied, the stable time measuring counter CTst may not be decremented, and the flow may proceed to step F405 without changing a count value.

In addition, the process in step F404 may be replaced with step F404A illustrated in FIG. 14B. In other words, this is an example in which, if it is determined that the condition in step F402 is not satisfied, a value of the stable time measuring counter CTst is reset to 0.

There are cases where any example of decrement, reset, and no change is very proper as described in the processing example 2.

4-5: Processing Example 4

The processing example 4 will be described with reference to FIGS. 16 and 17. The processing example 4 is an example in which estimation of a stable imaging state is performed on the basis of a detection result of an imaging field-of-view variation. Here, the example is an example in which a detection result of an exposure operation and a focus operation of the imaging apparatus 10 is especially used for estimation of a stable imaging state.

In addition, the exposure operation and the focus operation described here include a case of an automatic iris or automatic focus due to control of the control unit 30, and an exposure adjustment operation and a focus operation based on a user's operation.

The control unit 30 may perform detection of an exposure operation as follows.

An exposure adjustment is performed through an adjustment of a mechanical iris which is a diaphragm mechanism in the optical system 11, an adjustment of shutter speed of the imager 12, and an adjustment of a gain of a captured image signal obtained by the imager 12. The control unit 30 realizes the exposure adjustment by automatically performing some or all of the adjustments in response to a user's operation or in accordance with a luminance level detected from captured image data. Therefore, the control unit 30 can detect whether or not the control unit performs the exposure adjustment on the basis of an exposure control instruction value for the optical system driving unit 13, the imager 12, or the digital signal processing unit 20. In addition, a control amount thereof can be determined on the basis of the instruction value.

In addition, if a sensor detecting an aperture size of the mechanical iris is provided, the control unit 30 may detect an exposure adjustment operation performed by the mechanical iris on the basis of a detection value of the sensor.

Further, in a case where the digital signal processing unit 20 or the control unit 30 performs analysis of a luminance value of image data so as to detect the luminance value indicating an automatic exposure adjustment or to detect a large luminance variation, it may be detected that an exposure adjustment has been performed.

A focus adjustment is performed by moving the focus less in the optical system 11. The control unit 30 performs a focus adjustment in response to a user's operation, or automatically performs the focus adjustment through automatic focus control. Therefore, the control unit 30 can detect whether or not the focus adjustment is performed by the control unit, and a focus lens movement amount, on the basis of a control signal for the optical system driving unit 13.

In addition, if a focus lens position sensor is provided in the sensor unit 14, the control unit 30 can detect circumstances of a focus adjustment operation by detecting a detection value thereof.

Further, the digital signal processing unit 20 or the control unit 30 may perform focus analysis of image data, contrast analysis, or the like so as to detect that the focus lens has been moved.

FIG. 16A illustrates a process performed by the stable imaging state estimation portion 30b, as the processing example 4 of the stable imaging state estimation process.

In step F500, the control unit 30 branches the process depending on whether or not the stable imaging state estimation process is currently performed.

At the time when the stable imaging state estimation process is started, the control unit 30 makes the process proceed from step F500 to step F507 so as to reset the stable time measuring counter CTst to 0. In addition, an estimation flag Fst indicating whether or not a stable imaging state has been estimated to occur is initialized to Fst=0.

In the same manner as in the previous processing examples 1, 2 and 3, during a period of the estimation flag Fst=0, as the process of FIG. 2A, step F1000, that is, the process of FIG. 16A is repeatedly performed.

After the stable imaging state estimation process is started, the process of FIG. 16A proceeds from step F500 to step F501.

In step F501, the control unit 30 acquires a sensor input from the sensor unit 14, for example, a detection value of the focus lens position sensor, an instruction value of a focus lens movement instruction value issued to the optical system driving unit 13 by the control unit, an instruction value for exposure adjustment, or the like. In other words, each operation state of an exposure adjustment operation or a focus adjustment operation is detected.

Next, in step F502, the control unit 30 determines whether or not a variation in an exposure adjustment state due to the exposure adjustment is within a predetermined level range, and determines whether or not a focus variation due to the focus adjustment operation is within the predetermined level range. The predetermined level range in this case is a level range indicating circumstances in which the exposure adjustment or the focus adjustment is not performed, or an exposure state or a focus state is in a minute variation range even if the exposure adjustment or the focus adjustment is performed.

If it is determined that a motion of the exposure adjustment operation and the focus adjustment operation is within the predetermined level range, and the exposure adjustment operation and the focus adjustment operation are not performed or only a minute motion thereof is performed, the control unit 30 proceeds to step F503, and increments the stable time measuring counter CTst.

On the other hand, it is determined that the exposure adjustment operation or the focus adjustment operation is performed in an amount in which a detection value of the sensor exceeds the predetermined level range, the control unit 30 proceeds to step F504, and decrements the stable time measuring counter CTst.

In step F505, the control unit 30 compares a count value of the counter CTst with a predetermined time thTM for estimation.

If the value of the elapsed time counter CTt does not exceed the predetermined time thTM, the process is finished as it is. In other words, the estimation flag Fst=0 is maintained.

In addition, if CTst>thTM is determined in step F505, the control unit 30 proceeds to step F506, and sets the estimation flag Fst=1 assuming that a stable imaging state has been estimated to occur.

In the estimation flag Fst=1 as mentioned above, the control unit 30 starts the main subject determination process in step F1001 of FIG. 2A and proceeds to steps F1002 to F1004.

An operation example based on this process will be described with reference to FIG. 17.

Figure 17:
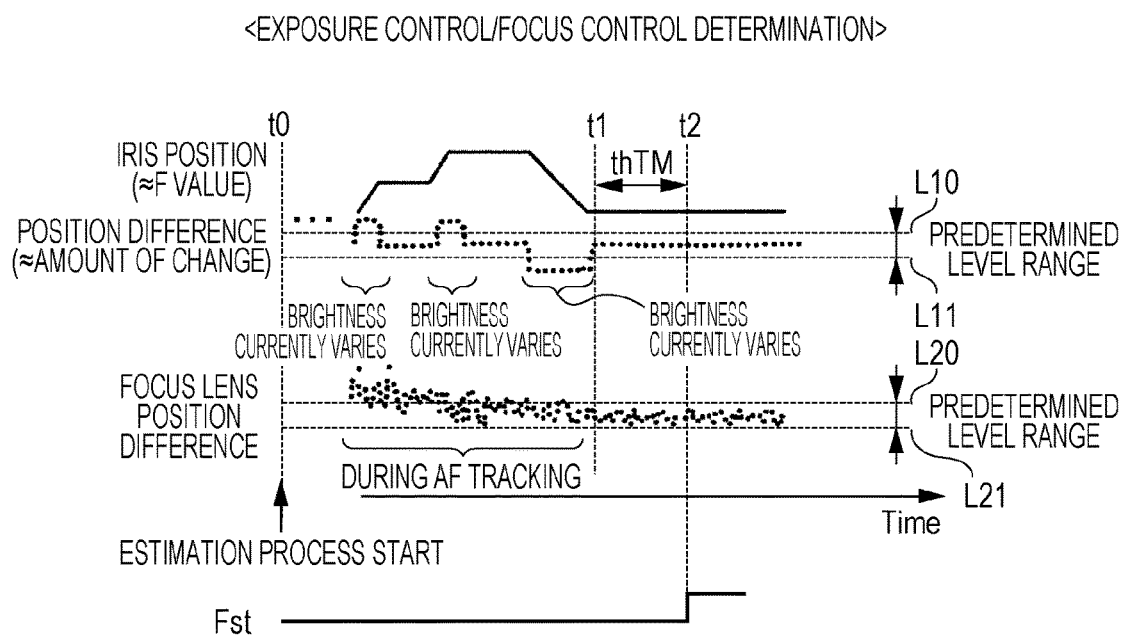
FIG. 17 is a diagram illustrating an operation in the processing example 4 according to the embodiment.

FIG. 17 illustrates an exposure adjustment operation and a focus adjustment operation, detected by the control unit 30 with the sensor or on the basis of an instruction value. In relation to the exposure adjustment operation, a position of the mechanical iris is indicated with a solid line, and position variations are indicated with dotted lines. Each dot indicates a value of the position variation detected by the control unit 30 at each time point in step F501.

In addition, in relation to the focus adjustment operation, focus lens position differences are indicated with dotted lines. Each dot indicates a value of a lens position variation amount detected by the control unit 30 at each time point in step F501.

The predetermined level range which is used for the determination in step F502 is a range between levels L10 and L11 of a detection value as an iris position difference, and a range between levels L20 and L21 of a detection value as a focus lens position difference. The range indicates that there is no variation in each of an aperture state of the mechanical iris and a focus lens position, or an amount of the variation is a minute amount even if there is the variation.

In addition, a value of the estimation flag Fst is also illustrated.

Further, it is assumed that the stable imaging state estimation process is started at the time point t0.

A position difference of the mechanical iris increases during a period in which the iris is driven for an exposure adjustment, but is zero during a period in which the iris is not driven.

A position difference of the focus lens also increases during a period in which the lens is driven for a focus adjustment, but is zero during a period in which the lens is not driven. However, the focus lens is slightly driven in a front and rear direction for automatic focus control at all times, and, in this case, a minute position variation is observed as illustrated in the figure. In this example, it is detected that an exposure adjustment or a focus adjustment has been performed up to the time point t1. Therefore, up to the time point t1, the exposure adjustment or the focus adjustment is manually performed by a user, or an exposure state or a focus state is adjusted through automatic control. In this case, circumstances are not expected in which the user waits for shutter timing for a subject.

If the exposure adjustment or the focus adjustment is stabilized, a captured image may also be stabilized, and thus the user may start practical imaging. For example, a large exposure adjustment or focus adjustment is not performed from the time point t1.

In the process of FIG. 16A, since the stable time measuring counter CTst is incremented in these circumstances, and if these circumstances last, a value of the stable time measuring counter CTst exceeds a value of the predetermined time thTM at a certain time. For example, CTst>thTM occurs at the time point t2.

If this is determined in step F505 described above, the estimation flag Fst is set to 1 in step F506. As in FIG. 17, the estimation flag Fst is set to 1 at the time point t2.

If a period in which a large exposure adjustment or focus adjustment is not performed as mentioned above lasts to some extent, it can be determined that an imaging field-of-view variation is very few, and an imaging field of view is stable. In this case, it is estimated that a stable imaging state occurs.

In the imaging apparatus 10, circumstances in which the exposure adjustment or the focus adjustment is scarcely performed can be estimated as a stable imaging state since a photographer is almost ready for imaging. Therefore, the main subject determination is started in step F1001 of FIG. 2A on the basis of the stable imaging state estimation result, and thus the main subject determination process is performed at an appropriate timing.

In addition, in the processing example 4 of FIG. 16A, although the flow proceeds to step F503 in an AND condition of an exposure adjustment operation and a focus adjustment operation in step F502, and the stable time measuring counter CTst is incremented, either one of an exposure adjustment operation and a focus adjustment operation may be a detection target, and the flow may proceed to step F403 in an OR condition with both of the operations as detection targets.

In addition, detection of the exposure adjustment operation may target all or some of a mechanical iris operation, a shutter speed changing operation, and a gain adjustment operation for a captured image signal.

In addition, there may be other processes of the stable time measuring counter CTst.

As indicated with dashed lines in FIG. 16A, if it is determined that the condition in step F502 is not satisfied, the stable time measuring counter CTst may not be decremented, and the flow may proceed to step F505 without changing a count value.

In addition, the process in step F504 may be replaced with step F504A illustrated in FIG. 16B. In other words, this is an example in which, if it is determined that the condition in step F502 is not satisfied, a value of the stable time measuring counter CTst is reset to 0.

There are cases where any example of decrement, reset, and no change is very proper as described in the processing example 2.

4-6: Processing Example 5

The processing example 5 will be described with reference to FIGS. 18, 19 and 20. The processing example 5 is an example of performing estimation of a stable imaging state on the basis of a detection result of an imaging field-of-view variation. However, here, the example is an example in which analysis of a motion vector of a captured image is performed, and an analysis result is used for estimation of a stable imaging state.

First, the motion vector mentioned here will be described with reference to FIG. 19.

FIG. 19A illustrates that the motion vector detection portion 27 detects a motion vector with captured image data of respective frames which are sequentially obtained on the time axis as targets.

As in FIG. 19B, the motion vector detection portion 27 performs a process in which a screen of one frame is divided into a plurality of regions, and detects a motion of a subject image as a vector in a period in which the frame transitions in each region.

As indicated with dashed lines or solid lines, a vector detected in each region is set as a local vector.

Here, the local vector includes a vector with high reliability and low reliability as vectors used for estimation of a stable imaging state.

For example, a region where a subject which is a target of main subject determination, such as a person, an animal, or a moving body, is present has high reliability since contrast thereof is relatively high.

On the other hand, a region where a subject is present on a background or like has relatively low contrast, and thus has low reliability.

In FIG. 19B, a local vector of a region with high reliability is indicated with the solid line, and a local vector of a region with low reliability is indicated with the dashed line.

In the processing example 5, a global motion of a screen is used for estimation of a stable imaging state. The global motion is indicated not by a local vector but by a global vector indicated with an arrow with diagonal lines. The global vector may be obtained by averaging local vectors with high reliability.

The motion vector detection portion 27 performs an operation of sequentially calculating global vectors from frame image data which is sequentially input and supplying the global vectors to the control unit 30.

FIG. 18A illustrates a process performed by the stable imaging state estimation portion 30b, as the processing example 5 of the stable imaging state estimation process.

In step F600, the control unit 30 branches the process depending on whether or not the stable imaging state estimation process is currently performed.

At the time when the stable imaging state estimation process is started, the control unit 30 makes the process proceed from step F600 to step F607 so as to reset the stable time measuring counter CTst to 0. In addition, an estimation flag Fst indicating whether or not a stable imaging state has been estimated to occur is initialized to Fst=0.

In the same manner as in the previous processing examples 1, 2, 3 and 4, during a period of the estimation flag Fst=0, as the process of FIG. 2A, step F1000, that is, the process of FIG. 18A is repeatedly performed.

After the stable imaging state estimation process is started, the process of FIG. 18A proceeds from step F600 to step F601.

In step F601, the control unit 30 acquires a value of a global vector from the motion vector detection portion 27. In addition, a value of the vector is acquired here, but a motion amount of the vector may be acquired in the present processing example.

Next, in step F602, the control unit 30 determines whether or not the acquired motion amount of the global vector is within a predetermined level range. The predetermined level range in this case is a level range indicating circumstances in which an amount of a global motion of a subject on a screen is small.

If it is determined that the motion amount of the global vector is within the predetermined level range, and there is no large motion in a captured image, the control unit 30 proceeds to step F603, and increments the stable time measuring counter CTst.

On the other hand, if it is determined that the motion amount of the global vector is an amount exceeding the predetermined level range, and there is no large motion in the captured image, the control unit 30 proceeds to step F604, and decrements the stable time measuring counter CTst.

In step F605, the control unit 30 compares a count value of the counter CTst with a predetermined time thTM for estimation.

If the value of the elapsed time counter CTt does not exceed the predetermined time thTM, the process is finished as it is. In other words, the estimation flag Fst=0 is maintained.

In addition, if CTst>thTM is determined in step F605, the control unit 30 proceeds to step F606, and sets the estimation flag Fst=1 assuming that a stable imaging state has been estimated to occur.

In the estimation flag Fst=1 as mentioned above, the control unit 30 starts the main subject determination process in step F1001 of FIG. 2A and proceeds to steps F1002 to F1004.

An operation example based on this process will be described with reference to FIG. 20.

Figure 20:
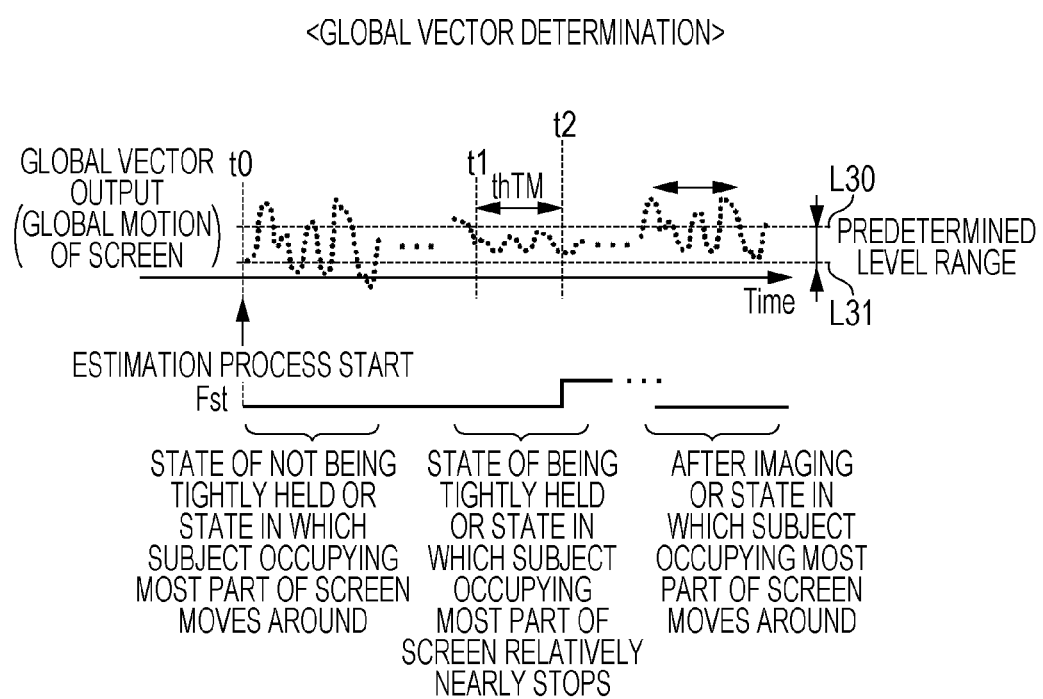
FIG. 20 is a diagram illustrating an operation in the processing example 5 according to the embodiment.

FIG. 20 illustrates a displacement of a scalar value of a global vector with dotted lines. Each dot indicates a motion amount of the global vector detected by the control unit 30 at each time point in step F601.

The predetermined level range which is used for the determination in step F602 is a range between levels L30 and L31 of the motion amount. The range indicates that there is no global motion in a subject on a captured image, or an amount of the global motion is a minute amount even if there is the global motion.

In addition, a value of the estimation flag Fst is also illustrated.

Further, it is assumed that the stable imaging state estimation process is started at the time point t0.

In this example, up to the time point t1, a relative large motion is detected as a global motion. For example, circumstances in which a user does not tightly hold the imaging apparatus 10, circumstances in which the user is roughly looking for a subject, or circumstances in which a subject greatly moves around are expected.

On the other hand, after the time point t1, a motion amount is reduced within the predetermined level range. This is expected as circumstances in which the user tightly holds the imaging apparatus 10, or a subject taking up a majority of a screen relatively nearly stops for the imaging apparatus 10.

In the process of FIG. 18A, the stable time measuring counter CTst is incremented in these circumstances after the time point t1, and a value of the stable time measuring counter CTst exceeds a value of the predetermined time thTM at the time point t2. If this is determined in step F605 described above, the estimation flag Fst is set to 1 in step F606. As in FIG. 20, the estimation flag Fst is set to 1 at the time point t2.

If a period in which a global motion on a captured image is small lasts to some extent, it can be determined that an imaging field-of-view variation is very few, and an imaging field of view is stable. In this case, it is estimated that a stable imaging state occurs.

In the same manner as in the above examples, in the processing example 5, the stable imaging state estimation portion 30b uses a detection result of a motion of a captured image for estimation of a stable imaging state. Particularly, global vector detection is performed as an analysis process regarding captured image data, and estimation of a stable imaging state in which an imaging field of view is stable is performed on the basis of circumstances of the motion.

In addition, in the processing example 5 of FIG. 18A, although it is determined whether or not a motion amount of a global vector is within the predetermined level range in step F502, the determination may be performed by also using a motion direction as a vector.

Further, since a local vector of each region is analyzed, and thus relative motion circumstances between various subjects and the imaging apparatus 10 can also be estimated, the local vector may be used.

In addition, there may be other processes of the stable time measuring counter CTst.

As indicated with dashed lines in FIG. 18A, if it is determined that the condition in step F602 is not satisfied, the stable time measuring counter CTst may not be decremented, and the flow may proceed to step F605 without changing a count value.

In addition, the process in step F604 may be replaced with step F604A illustrated in FIG. 18B. In other words, this is an example in which, if it is determined that the condition in step F602 is not satisfied, a value of the stable time measuring counter CTst is reset to 0.

There are cases where any example of decrement, reset, and no change is very proper as described in the processing example 2.

4-7: Predetermined Time Changing Process Used in Estimation Process

In the above-described processing examples 1 to 5, the predetermined time thTM is used for estimation of a stable imaging state. The predetermined time thTM may be set to a fixed value in each processing example, but may be varied as in the following. In other words, a condition regarding time used for estimation of a stable imaging state in the stable imaging state estimation process is varied depending on an execution timing of the stable imaging state estimation process.

FIG. 21 illustrates an example thereof. For example, three kinds of time thTM1, time thTM2 and thTM3 are provided as the predetermined time thTM. It is assumed that thTM1>thTM2>thTM3.

The stable imaging state estimation process is performed at the opportunity described in FIGS. 9 and 10, but, for example, in a case where the stable imaging state estimation process is within a predetermined period after power is turned on, the relatively long time thTM1 is used as the predetermined time thTM. In addition, also in a case where the stable imaging state estimation process is performed within a predetermined period after transition is performed from the reproduction mode MD2 to the camera mode MD1, the relatively long time thTM1 is used as the predetermined time thTM.

In these cases, circumstances seldom occur in which a user promptly tightly holds a camera and aims at a subject right after performing a power operation or a mode operation. Therefore, lengthening the predetermined time thTM for estimation of a stable imaging state is suitable in the meaning of increasing accuracy of estimation.

During the camera mode MD1 after the predetermined time has elapsed from power-on or transition of the camera mode MD1, and, when main subject determination is not performed yet, the standard time thTM2 is used as the predetermined time thTM.

This is because a user is ready for an imaging operation to some extent.

However, the shortest time thTM3 is used as the predetermined time thTM at an opportunity in which the stable imaging state estimation process is performed again after main subject determination is performed once. For example, as described in FIGS. 9 and 10, this is because a new main subject determination process is required to be rapidly performed after main subject information is unable to be used.

In addition, the standard time thTM2 is used as the predetermined time thTM in circumstances in which some period lasts, that is, a period in which main subject determination is not performed lasts.

Figure 22:
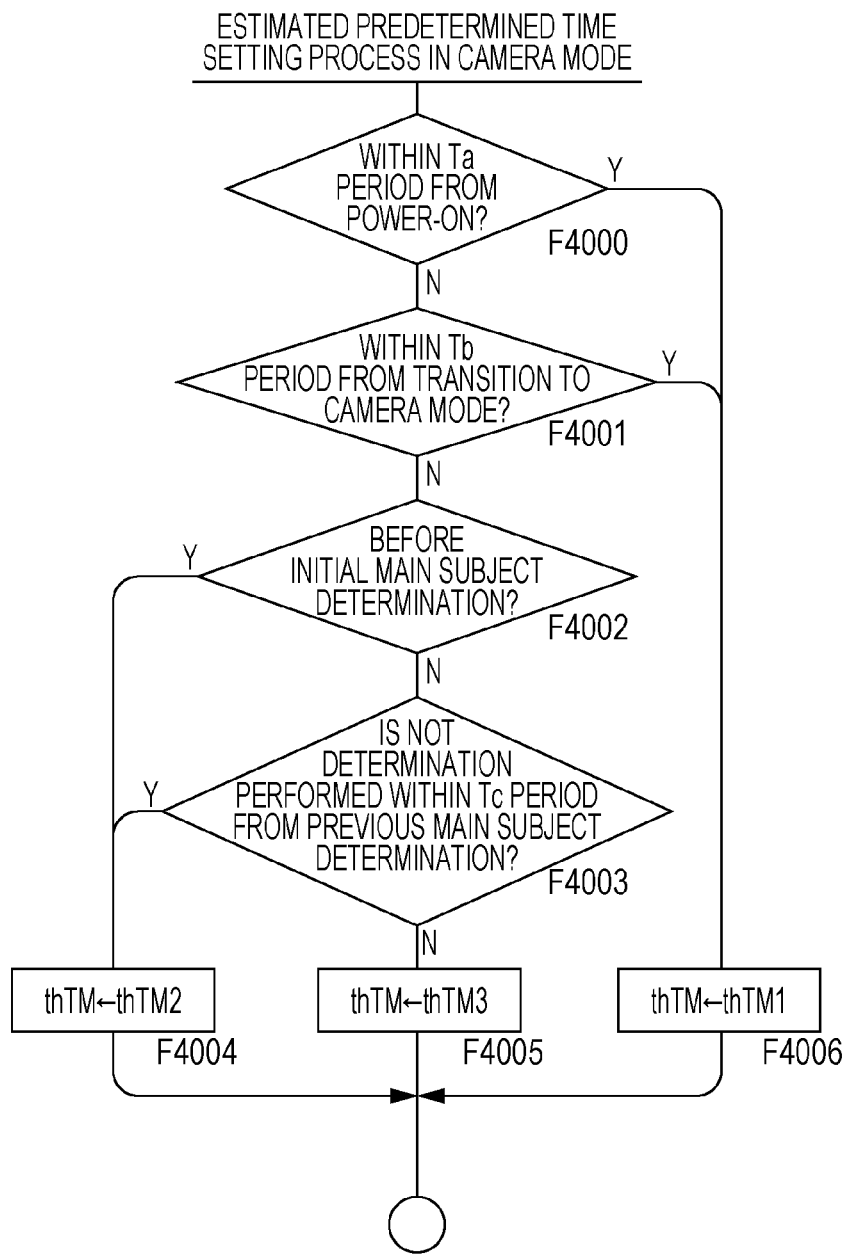
FIG. 22 is a flowchart illustrating a predetermined time changing process according to the embodiment.

The above description is an example, and, for example, the control unit 30 performs an estimation predetermined time setting process as in FIG. 22 through an interruption process or the like at a certain time interval so as to change the predetermined time thTM depending on an execution opportunity of the stable imaging state estimation process.

In FIG. 22, in step F4000, the control unit 30 determines whether or not a period is within a Ta period from power-on. If the period is within the Ta period, the longest time thTM1 is set as the predetermined time thTM in step F4006.

In addition, if a period is not within the Ta period from power-on, the control unit 30 determines whether or not the period is within a Tb period from transition to the camera mode MD1 in step F4001. If the period is within the Tb period, the longest time thTM1 is set as the predetermined time thTM in step F4006.

If the period does not correspond to the determinations in steps F4000 and F4001, the control unit 30 branches the process in step F4002 depending on whether or not an initial main subject determination process has been performed after power-on or transition to the camera mode MD1. If the initial main subject determination process has not been performed, the standard time thTM2 is set as the predetermined time thTM in step F4004.

If the initial main subject determination process has been performed, the control unit 30 determines whether or not main subject determination has been performed within a Tc period from a previous main subject determination in step F4003. If the main subject determination has not been performed, the standard time thTM2 is set as the predetermined time thTM in step F4004.

On the other hand, if the main subject determination has been performed in step F4003, the shortest time thTM3 is set as the predetermined time thTM in step F4005.

In the stable imaging state estimation process, the predetermined time thTM set due to the above-described process of FIG. 22 is used at an execution time thereof.

Accordingly, as exemplified in FIG. 21, an appropriate predetermined time thTM for an estimation process is used depending on an execution opportunity of the stable imaging state estimation process, and thus an appropriate operation is realized.

5. Another Processing Example in Image Processing Device

The above-described processing examples 1 to 5 have been described as specific examples of step F1000 in the process of FIG. 2A.

The example of FIG. 2A is, that is, an example in which the main subject determination portion 30a performs the main subject determination process in a case where it is estimated that a stable imaging state occurs due to the stable imaging state estimation process, and outputs a result thereof.

Here, in relation to the stable imaging state estimation process and the main subject determination process performed in the imaging apparatus 10 of FIG. 3 or the image processing device 1 of FIG. 1, not only the example illustrated in FIG. 2A but also an example as illustrated in FIG. 23 may be considered.

In the example of FIG. 23, during the camera mode, as in FIG. 23A, the main subject determination process is repeatedly performed at any time.

In other words, during a period of the camera mode MD1, the main subject determination portion 30a starts detection of candidate images in step F2000, and performs the main subject determination process in step F2001. A detailed process of step F2001 is the same as in steps F1 to F3 of FIG. 2B.

If main subject determination is determined in step F2001, main subject information which is a determination result is not sent to an application or the like at that time, and is held in an internal memory in step F2002. Then, the processes in steps F2000, F2001 and F2002 are performed again.

Meanwhile, the stable imaging state estimation process in the stable imaging state estimation portion 30b is performed as in FIG. 23B at the execution opportunity as described in FIGS. 9 and 10.

First, the control unit 30 performs the stable imaging state estimation process in step F3000. For example, the stable imaging state estimation process is performed as in the above-described processing examples 1 to 5.

If it is estimated that a stable imaging state occurs at a certain time, the control unit 30 makes the process to proceed from step F3001 to step F3002, and obtains main subject information. This is to read, from the internal memory, the latest main subject information stored at that time as the main subject determination process which is performed at any time as in FIG. 23A.

In addition, the control unit 30 sends the acquired main subject information to an application or the like in step F3003.

In other words, in the above-described process of FIG. 23, the main subject determination portion 30a sequentially performs the main subject determination process. In addition, the stable imaging state estimation portion 30b performs the stable imaging state estimation process at the execution opportunity described in FIGS. 9 and 10. This example is an example in which the control unit 30 outputs the latest result of the main subject determination process in a case where it is estimated that a stable imaging state occurs due to the stable imaging state estimation process.

Also through this process, the main subject information can be output to the application or the like at an appropriate timing.

6. Application to Program and Computer Apparatus

As mentioned above, the embodiments of the image processing device 1 and the imaging apparatus 10 have been described, and the above-described main subject determination process may be performed in hardware or in software.

The program of an embodiment is a program which causes, for example, an arithmetic processing device such as a central processing unit (CPU) or a digital signal processor (DSP) to perform the processes described in the above embodiment.

In other words, the program is a program which causes the arithmetic processing device to perform a stable imaging state estimation step of performing a stable imaging state estimation process of estimating whether or not a stable imaging state occurs, a main subject determination step of performing a main subject determination process, and an output step of outputting a result of the main subject determination process in a case where it is estimated that the stable imaging state occurs due to the stable imaging state estimation process.

Figure 2:
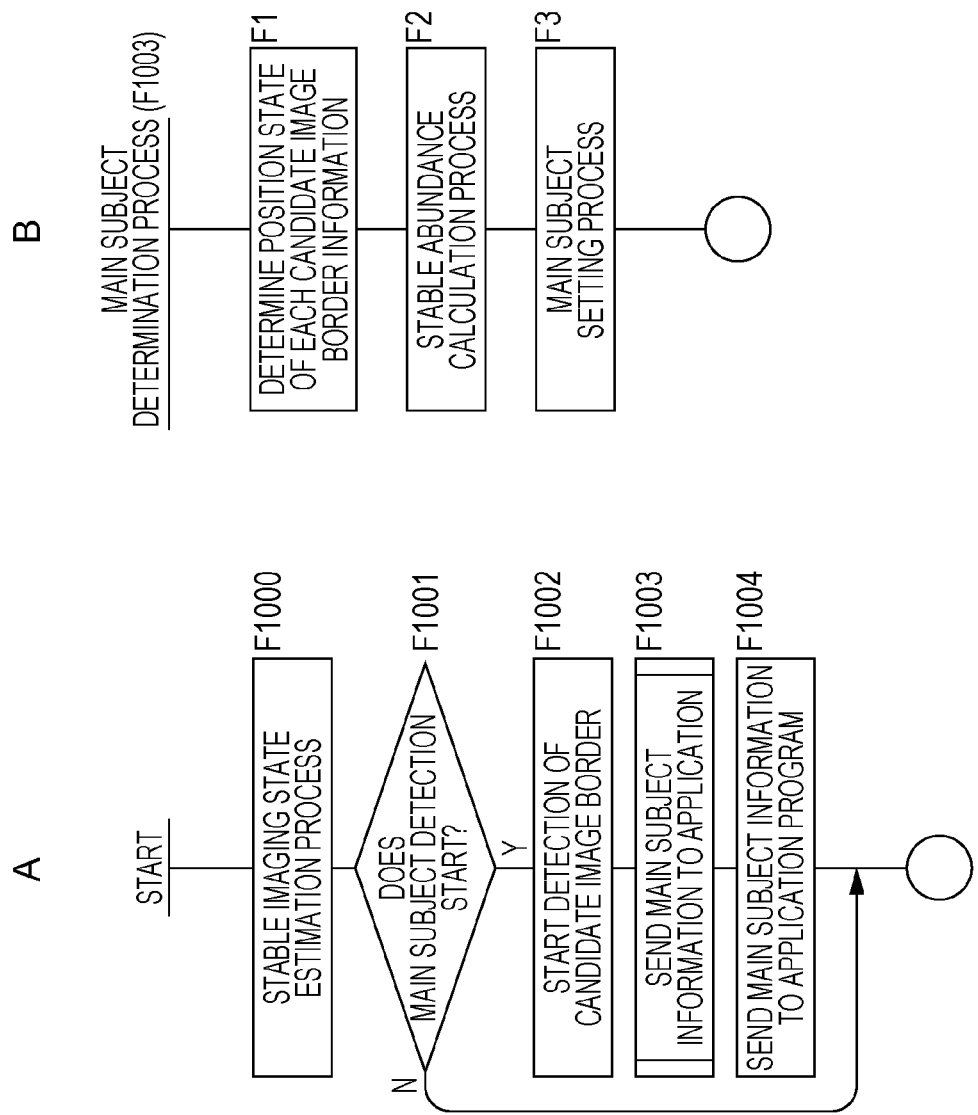
FIG. 2 is a flowchart illustrating a main subject determination process in the image processing device according to the embodiment.

Specifically, the program of the embodiment may be a program which causes the arithmetic processing device to perform the process illustrated in FIG. 2 or FIG. 23, the process described in FIGS. 4 and 8 in relation to the main subject determination process, and further the process described in the processing examples 1 to 5 in relation to the stable imaging state estimation process.

A device which performs the above-described stable imaging state estimation process and main subject determination process can be realized by the arithmetic processing device by using the program.

The program may be recorded in an HDD which is a recording medium built into an apparatus such as a computer apparatus, a ROM of a microcomputer having a CPU, or the like in advance.

Alternatively, the program may be temporarily or permanently on a removable recording medium such as a flexible disc, a compact disc read only memory (CD-ROM), a magnet optical (MO) disc, a digital versatile disc (DVD), a Blu-ray Disc, a magnetic disk, a semiconductor memory, or a memory card. Such a removable recording medium may be provided as so-called package software.

In addition, the program may be not only installed to a personal computer from the removable recording medium but may also be downloaded from a download side via a network such as a local area network (LAN) or the Internet.

Further, the program is suitable for the image processing device of the embodiment to be widely provided. For example, by downloading the program to a personal computer, a portable information processing apparatus, a gaming apparatus, a video apparatus, a personal digital assistant (PDA), and the like, the portable information processing apparatus and the like can be used as the image processing device of the present disclosure.

Figure 24:
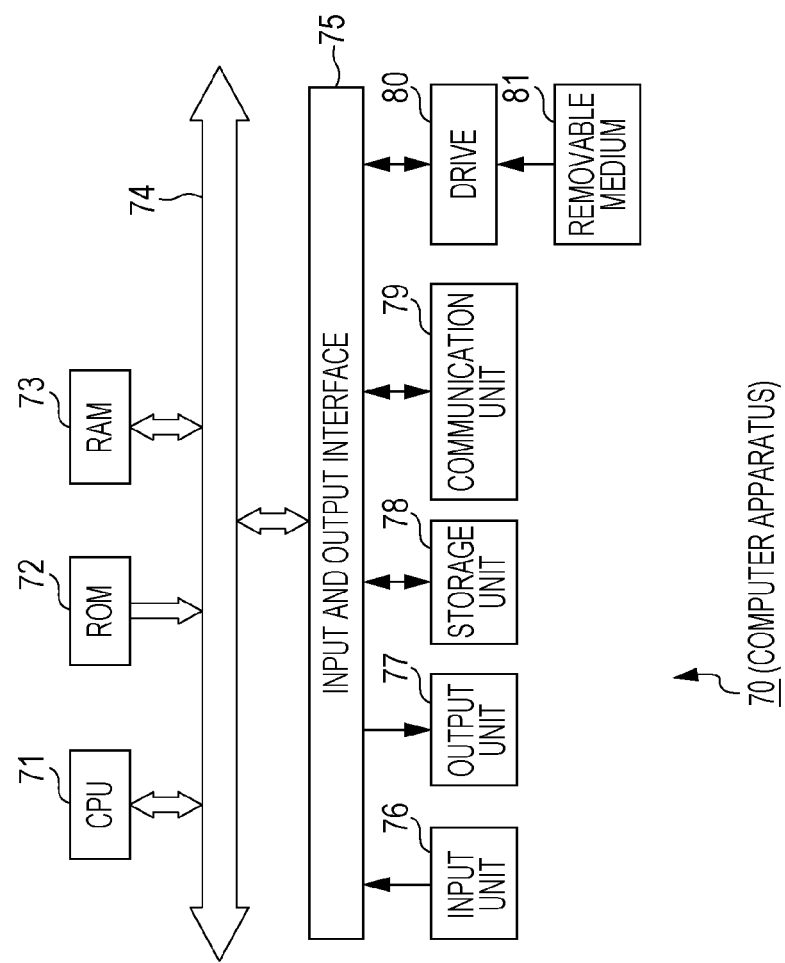
FIG. 24 is a block diagram illustrating a case where the present disclosure is applied to a computer apparatus according to the embodiment.

For example, a computer apparatus as illustrated in FIG. 24 is enabled to perform the stable imaging state estimation process and the main subject determination process in the image processing device 1 of FIG. 1 or the imaging apparatus 10.

In FIG. 24, a CPU 71 of a computer apparatus 70 performs various processes according to a program stored in a ROM 72 or a program loaded to a RAM 73 from a storage unit 78. The RAM 73 stores data or the like which is necessary for the CPU 71 to perform various processes as appropriate.

The CPU 71, the ROM 72, and the RAM 73 are connected to each other via a bus 74. The bus 74 is also connected to an input and output interface 75.

The input and output interface 75 is connected to an input unit 76 including a keyboard, a mouse, and the like, an output unit 77 including a display constituted by a cathode ray tube (CRT), an LCD, or an organic EL panel, and a speaker, a storage unit 78 including a hard disk and the like, and a communication unit 79 including a modem or the like. The communication unit 79 performs a communication process via a network including the Internet.

The input and output interface 75 is also connected to a drive 80 as necessary. A removable medium 81 such as a magnetic disk, an optical disc, a magneto-optical disc, or a semiconductor memory is installed in the drive as appropriate, and a computer program read therefrom is installed in the storage unit 78 as necessary.

In a case where the above-described stable imaging state estimation process and main subject determination process are performed in software, a program constituting the software is installed from a network or a recording medium.

The recording medium includes, for example, as illustrated in FIG. 24, the removable medium 81 such as a magnetic disk (including a flexible disc), an optical disc (including a Blu-ray Disc (registered trademark), a CD-ROM and a DVD), a magneto-optical disc (including a mini disc (MD)), or a semiconductor memory, which is distributed so as to deliver a program to a user separately from a device body. Alternatively the recording medium includes the ROM 72 which records a program which is delivered to a user in a state of being incorporated in a device body in advance therein, a hard disk included in the storage unit 78, or the like.

In the computer apparatus 70, when moving image data is input through a reception operation of the communication unit 79, a reproduction operation in the drive 80, the removable medium 81, or the recording unit 78, or the like, the CPU 71 executes functions of the above-described stable imaging state estimation portion (3, 30*b*) and the main subject determination portion (2, 30*a*) on the basis of the program. In other words, the process as in FIGS. 2 and 23 is performed, and thus main subject determination can be performed on the input image data at an appropriate timing.

7. Modification Examples

The above-described embodiment may have various modification examples.

In the stable imaging state estimation process, a plurality of processing examples may be combined with each other among the above-described processing examples 1 to 5.

For example, some of the processing examples 1 to 5 are combined, and a stable imaging state may be estimated to occur in an OR condition or an AND condition of estimation results of a stable imaging state in the respective processing examples.

In addition, in a case of combining the processing examples 1 to 5, a weight for estimation of a stable imaging state may be changed or a priority of determination may be set in each processing example. For example, in a case where the processing example 2 is combined with the processing example 3, incremented values of the counter CTst are made different or the predetermined time thTM is set to different values in the respective processing examples.

In addition, in the example of the imaging apparatus 10, the stable imaging state estimation process is performed in the camera mode MD1 or the main subject determination mode MD11, but may be performed in the reproduction mode MD2.

For example, main subject information is used in an image effect process or an image editing process, but, for this reason, a main subject determination process is performed with a reproduced image as a target, and thus performing the main subject determination process may also be useful after performing a stable imaging state estimation at the time of imaging in the reproduced image.

For example, circumstances in which a variation in a reproduced image is small may be estimated as having been a stable imaging state at the time of imaging, a main subject determination process may be performed at that time, and an image editing process and an image effect process may be performed so as to perform reproduction display, creation of edited data, and the like.

In addition, a stable imaging state estimation process and a main subject determination process targeting such a reproduced image are naturally expected to be performed by the image processing device of FIG. 1, the information processing apparatus of FIG. 24, and the like.

In addition, a result of the main subject determination process may be added to still image data or moving image data which is captured and recorded thereafter as metadata. In other words, information indicating a calm subject is added to a still image file or the like.

Further, while a through image is displayed, and a main subject determination process is also performed, a main subject designation operation may be performed through a photographer's operation.

In addition, although, in the embodiment, a process of determining a main subject has been described assuming that a still image is mainly captured, the above-described process of the embodiment may be applied as a process of performing main subject determination from a plurality of captured frames even during standby for capturing a moving image or during execution of capturing and recording of a moving image.

Further, the present technology may also have the following configurations.

(1) An image processing device including a stable imaging state estimation portion that performs a stable imaging state estimation process of estimating whether or not a stable imaging state occurs; and a main subject determination portion that performs a main subject determination process, and also outputs a result of the main subject determination process when it is estimated that the stable imaging state occurs due to the stable imaging state estimation process.

(2) The image processing device according to the above (1), in which the stable imaging state estimation portion performs estimation of the stable imaging state on the basis of a detection result of an imaging field-of-view variation in the stable imaging state estimation process.

(3) The image processing device according to the above (2), in which the stable imaging state estimation portion uses an output of a sensor which detects a motion of an imaging apparatus generating a captured image, for detection of the imaging field-of-view variation.

(4) The image processing device according to the above (2) or (3), in which the stable imaging state estimation portion uses an output of a sensor which detects a motion of an imaging optical system of an imaging apparatus generating a captured image, for detection of the imaging field-of-view variation.

(5) The image processing device according to any one of the above (2) to (4), in which the stable imaging state estimation portion uses an instruction value for controlling an operation of an imaging apparatus generating a captured image, for detection of the imaging field-of-view variation.

(6) The image processing device according to any one of the above (2) to (5), in which the stable imaging state estimation portion uses a result of an analysis process regarding captured image data, for detection of the imaging field-of-view variation.

(7) The image processing device according to the above (6), in which the stable imaging state estimation portion detects a motion of a captured image as the analysis process regarding the captured image data.

(8) The image processing device according to any one of the above (1) to (7), in which the stable imaging state estimation portion estimates that the stable imaging state occurs on the condition that a predetermined time has elapsed from the time of a transition to a predetermined mode state in which the main subject determination process effectively functions.

(9) The image processing device according to any one of the above (1) to (8), in which the stable imaging state estimation portion varies a condition regarding time used for estimation of the stable imaging state in the stable imaging state estimation process, depending on an execution timing of the stable imaging state estimation process.

(10) The image processing device according to any one of the above (1) to (9), in which the stable imaging state estimation portion performs the stable imaging state estimation process when a predetermined mode state occurs in which the main subject determination process effectively functions.

(11) The image processing device according to any one of the above (1) to (10), in which the stable imaging state estimation portion performs the stable imaging state estimation process after the result of the main subject determination process is unable to be used or is not required to be used.

(12) The image processing device according to any one of the above (1) to (11), in which the main subject determination portion performs the main subject determination process when it is estimated that the stable imaging state occurs due to the stable imaging state estimation process, and outputs main subject information which is the result of the main subject determination process.

(13) The image processing device according to the above (1) to (11), in which the main subject determination portion sequentially performs the main subject determination process, and outputs main subject information which is a result of the latest main subject determination process when it is estimated that the stable imaging state occurs due to the stable imaging state estimation process.

REFERENCE SIGNS LIST

1 IMAGE PROCESSING DEVICE, 2 MAIN SUBJECT DETERMINATION PORTION, 3 STABLE IMAGING STATE ESTIMATION PORTION, 10 IMAGING APPARATUS, 11 OPTICAL SYSTEM, 12 IMAGER, 13 OPTICAL SYSTEM DRIVING UNIT, 14 SENSOR UNIT, 15 RECORDING UNIT, 16 COMMUNICATION UNIT, 20 DIGITAL SIGNAL PROCESSING UNIT, 21 PREPROCESSING PORTION, 22 SYNCHRONIZATION PORTION, 23 YC GENERATION PORTION, 24 RESOLUTION CONVERSION PORTION, 25 CODEC PORTION, 26 CANDIDATE DETECTION PORTION, 27 MOTION VECTOR DETECTION PORTION, 30 CONTROL UNIT, 30a MAIN SUBJECT DETERMINATION PORTION, 30b STABLE IMAGING STATE ESTIMATION PORTION, 32 UI CONTROLLER, 33 USER INTERFACE, 34 DISPLAY PORTION, 35 OPERATION PORTION, 70 COMPUTER APPARATUS, 71 CPU

The invention claimed is:

1. An image processing device comprising circuitry configured to perform a stable imaging state estimation process within a predetermined period of time for estimating whether or not a stable imaging state occurs; and perform a main subject determination process in response to estimating that a stable imaging state has occurred, and output a result of the main subject determination process in an event that the stable imaging state occurred, wherein the circuitry determines an operating state of an imaging device and selects the predetermined period of time used for the estimation of the stable imaging state in the stable imaging state estimation process from two or more predetermined periods of time corresponding to different operating states of the imaging device, based on the determined operating state of the imaging device, wherein the circuitry selects a first value of the predetermined period of time in response to determining that the operating state of the imaging device is within a first time period after transition to camera mode, wherein the circuitry selects a second value, different from the first value, of the predetermined period of time in response to determining that the operating state of the imaging device is after the first time period and prior to execution of an initial main subject determination process and wherein the circuitry performs the stable imaging state estimation process within the selected period of time.

2. The image processing device according to claim 1, wherein the circuitry performs estimation of the stable imaging state on the basis of a detection result of an imaging field-of-view variation in the stable imaging state estimation process.

3. The image processing device according to claim 2, wherein the circuitry uses an output of a gyro sensor which detects a shaking level of an imaging apparatus and an output of an accelerometer sensor which detects posture of the imaging apparatus generating a captured image, for detection of the imaging field-of-view variation.

4. The image processing device according to claim 2, wherein the circuitry uses an output of a gyro sensor which detects at least one of a panning operation and a tilting operation, and an instruction value of a zooming operation of an imaging optical system of an imaging apparatus generating a captured image, for detection of the imaging field-of-view variation.

5. The image processing device according to claim 2, wherein the circuitry uses an instruction value for controlling focus lens movement and an instruction value for exposure adjustment of an imaging apparatus generating a captured image, for detection of the imaging field-of-view variation.

6. The image processing device according to claim 2, wherein the circuitry uses a result of an analysis process regarding captured image data, for detection of the imaging field-of-view variation.

7. The image processing device according to claim 6, wherein the circuitry detects a global vector of a captured image as the analysis process regarding the captured image data.

8. The image processing device according to claim 1, wherein the circuitry estimates that the stable imaging state occurs on the condition that a predetermined time has elapsed from the time of a transition to a predetermined mode state in which the main subject determination process effectively functions.

9. The image processing device according to claim 1, wherein the predetermined period of time is based on at least one of a timing when the imaging apparatus is powered on, a timing when a transition of camera mode is occurred and before performing the main subject determination process, and a timing after performing the main subject determination process once.

10. The image processing device according to claim 1, wherein the circuitry performs the stable imaging state estimation process when a predetermined mode state occurs in which the main subject determination process effectively functions.

11. The image processing device according to claim 1, wherein the circuitry performs the stable imaging state estimation process after the result of the main subject determination process is unable to be used or is not required to be used.

12. The image processing device according to claim 1, wherein the circuitry performs the main subject determination process in an event that the stable imaging state occurred, and outputs main subject information which is the result of the main subject determination process.

13. The image processing device according to claim 1, wherein the circuitry sequentially performs the main subject determination process, and outputs main subject information which is a result of the latest main subject determination process in an event that the stable imaging state occurred.

14. An image processing method comprising:
performing, by circuitry, a stable imaging state estimation process within a predetermined period of time for estimating whether or not a stable imaging state occurs;
in response to estimating that a stable imaging state has occurred, performing, by the circuitry, a main subject determination process; and
outputting, by the circuitry, a result of the main subject determination process in an event that the stable imaging state occurred, wherein the circuitry determines an operating state of an imaging device and selects the predetermined period of time used for the estimation of the stable imaging state in the stable imaging state estimation process from two or more predetermined periods of time corresponding to different operating states of the imaging device, based on the determined operating state of the imaging device, wherein the circuitry selects a first value of the predetermined period of time in response to determining that the operating state of the imaging device is within a first time period after transition to camera mode, wherein the circuitry selects a second value, different from the first value, of the predetermined period of time in response to determining that the operating state of the imaging device is after the first time period and prior to execution of an initial main subject determination process and wherein the circuitry performs the stable imaging state estimation process within the selected period of time.

15. A non-transitory computer-readable medium encoded with computer-executable instructions that, when executed by a processing device, perform an image processing method comprising:
performing a stable imaging state estimation process within a predetermined period of time for estimating whether or not a stable imaging state occurs;
in response to estimating that a stable imaging state has occurred, performing a main subject determination process; and
outputting a result of the main subject determination process in an event that the stable imaging state occurred, wherein the circuitry determines an operating state of an imaging device and selects the predetermined period of time used for the estimation of the stable imaging state in the stable imaging state estimation process from two or more predetermined periods of time corresponding to different operating states of the imaging device, based on the determined operating state of the imaging device, wherein a first value of the predetermined period of time is selected in response to determining that the operating state of the imaging device is within a first time period after transition to camera mode, wherein a second value, different from the first value, of the predetermined period of time is selected in response to determining, that the operating state of the imaging device is after the first time period and prior to execution of an initial main subject determination process and wherein the stable imaging state estimation process is performed within the selected period of time.

* * * * *